United States Patent
Gu et al.

(10) Patent No.: US 12,032,938 B2
(45) Date of Patent: Jul. 9, 2024

(54) PLUG-IN INSTALLATION METHOD, APPARATUS, AND STORAGE MEDIUM

(71) Applicant: Huawei Technologies Co., Ltd., Shenzhen (CN)

(72) Inventors: Yue Gu, Shenzhen (CN); Wenshuai Yin, Shenzhen (CN); Ke Wan, Shenzhen (CN); Xiang Xu, Shenzhen (CN); Mingjiang Li, Shenzhen (CN)

(*) Notice: Subject to any disclaimer, the term of this patent is extended or adjusted under 35 U.S.C. 154(b) by 0 days.

(21) Appl. No.: 17/754,870

(22) PCT Filed: Sep. 15, 2020

(86) PCT No.: PCT/CN2020/115374
§ 371 (c)(1),
(2) Date: Apr. 14, 2022

(87) PCT Pub. No.: WO2021/073337
PCT Pub. Date: Apr. 22, 2021

(65) Prior Publication Data
US 2024/0095000 A1 Mar. 21, 2024

(30) Foreign Application Priority Data
Oct. 15, 2019 (CN) .......................... 201910980401.0

(51) Int. Cl.
*G06F 8/61* (2018.01)
*G06F 8/65* (2018.01)
*G06F 9/445* (2018.01)

(52) U.S. Cl.
CPC .................. *G06F 8/61* (2013.01); *G06F 8/65* (2013.01); *G06F 9/44526* (2013.01)

(58) Field of Classification Search
USPC ......................................................... 717/174
See application file for complete search history.

(56) References Cited

U.S. PATENT DOCUMENTS

| 8,185,889 B2 | 5/2012 | Kinder et al. |
| 8,661,420 B2 * | 2/2014 | Smithline ............... G06F 9/541 717/138 |

(Continued)

FOREIGN PATENT DOCUMENTS

| CN | 1524216 A | 8/2004 |
| CN | 104820676 A | 8/2015 |

(Continued)

OTHER PUBLICATIONS

Wikipedia, "Software versioning", https://en.wikipedia.org/w/index.php?oldid=920624989&title=Software_versioning, Oct. 10, 2019, 16 pages.

*Primary Examiner* — Qing Chen
*Assistant Examiner* — Clint Thatcher
(74) *Attorney, Agent, or Firm* — Slater Matsil, LLP

(57) ABSTRACT

An electronic device receives a first user operation. The first user operation is used to request to install a first plug-in related to a first application, the first application includes a first plug-in framework and at least one plug-in associated with the first plug-in framework, a major version number of each of the at least one plug-in is the same as a major version number of the first plug-in framework, and the first plug-in is different from the at least one plug-in. The electronic device receives the first plug-in from a server. The electronic device detects whether a major version number of the first plug-in is the same as the major version number of the first plug-in framework. If yes, the electronic device installs the first plug-in.

20 Claims, 17 Drawing Sheets

(56) References Cited

U.S. PATENT DOCUMENTS

| | | | |
|---|---|---|---|
| 8,856,740 B2* | 10/2014 | Wilson | G06F 9/44526 |
| | | | 717/121 |
| 2003/0110312 A1 | 6/2003 | Gunduc et al. | |
| 2011/0029673 A1* | 2/2011 | Jaisinghani | H04L 41/12 |
| | | | 709/226 |
| 2012/0159145 A1* | 6/2012 | Cheong | G06F 8/61 |
| | | | 713/100 |
| 2016/0226663 A1 | 8/2016 | Jones et al. | |
| 2018/0048660 A1* | 2/2018 | Paithane | G06F 21/566 |
| 2019/0163516 A1 | 5/2019 | Noorshams et al. | |

FOREIGN PATENT DOCUMENTS

| | | |
|---|---|---|
| CN | 105335187 A | 2/2016 |
| CN | 105511902 A | 4/2016 |
| CN | 105872842 A | 8/2016 |
| CN | 106331135 A | 1/2017 |
| CN | 107122200 A | 9/2017 |
| CN | 107402761 A | 11/2017 |
| CN | 109408133 A | 3/2019 |
| CN | 109729116 A | 5/2019 |
| WO | 2017050094 A1 | 3/2017 |

* cited by examiner

PLUG-IN INSTALLATION METHOD, APPARATUS, AND STORAGE MEDIUM

CROSS-REFERENCE TO RELATED APPLICATIONS

This application is a National Stage of International Application No. PCT/CN2020/115374, filed on Sep. 15, 2020, which claims priority to Chinese Patent Application No. 201910980401.0, filed on Oct. 15, 2019, both of which are hereby incorporated by reference in their entireties.

TECHNICAL FIELD

This application relates to the field of electronic technologies, and in particular, to a plug-in installation method, an apparatus, and a storage medium.

BACKGROUND

Plugging-in: After a software project is developed and used, new functions need to be added, which are generally expected to be embedded into a system without modification of an original application. This is called plugging-in, and a new function module is called a plug-in. Plugging-in can greatly reduce coupling between modules, facilitates independent maintenance of each module, and accelerates maintenance and update of a project.

An Android App Bundle (Android App Bundle) is an improved application packaging manner that can greatly reduce a size of an application, and is an official dynamic release solution of Google on an Android system. In this solution, the application can be split into a plurality of plug-ins, and the plug-ins can be downloaded and installed from Google Play Store.

However, all plug-ins that are released in Google Play Store and that correspond to a same application are developed and released in a binding manner. To be specific, when developing and upgrading a plug-in of an application, a developer usually needs to bind and upgrade all plug-ins of the application, version numbers of all the plug-ins need to be totally the same as a version number of a plug-in framework of the application, and the developer also needs to bind and release all the plug-ins together.

When a user needs to download and install a plug-in of an application from Google Play Store, the user needs to download and install all plug-ins released by the application. In addition, before installing the plug-in, the user needs to ensure that version numbers of all the plug-ins and a version number of a plug-in framework are totally the same.

SUMMARY

This application discloses a plug-in installation method, an apparatus, and a storage medium, to meet a requirement of a user for separately downloading and installing different plug-in capabilities, thereby improving user experience.

According to a first aspect, an embodiment of this application provides a plug-in installation method. The method includes:

An electronic device receives a first user operation. The first user operation is used to request to install a first plug-in related to a first application, the first application is an application locally installed in the electronic device, the first application includes a first plug-in framework and at least one plug-in associated with the first plug-in framework, a major version number of each of the at least one plug-in is the same as a major version number of the first plug-in framework, each of the at least one plug-in has a second version number corresponding to the plug-in, the first plug-in framework has a first version number, both the first version number and the second version number include a major version number, a sub version number, and a phase version number, and the first plug-in is different from the at least one plug-in.

The electronic device receives the first plug-in from a server in response to the first user operation.

The electronic device detects whether a major version number of the first plug-in is the same as the major version number of the first plug-in framework.

If yes, the electronic device installs the first plug-in.

When installing a plug-in, the electronic device may install the plug-in after ensuring that a major version number of the plug-in is the same as a major version number of a plug-in framework. Compared with a means in which installation can be performed only when a version number of a plug-in and a version number of a plug-in framework are totally the same in the conventional technology, plug-in installation of the electronic device in this solution is more flexible and has higher compatibility. In addition, in this solution, a user can download and install different plug-ins based on different requirements, and does not need to install all plug-ins of a corresponding application. This improves user experience.

Optionally, a phase version number of the first plug-in is different from a phase version number of the first plug-in framework.

When installing a plug-in, the electronic device may install the plug-in after ensuring that a major version number of the plug-in is the same as a major version number of a plug-in framework, and a phase version number of the plug-in is different from a phase version number of the plug-in framework. Compared with a means in which installation can be performed only when a version number of a plug-in and a version number of a plug-in framework are totally the same in the conventional technology, plug-in installation of the electronic device in this solution is more flexible and has higher compatibility.

Optionally, the at least one plug-in includes a second plug-in, and the first plug-in is an update plug-in corresponding to the second plug-in. A version number of the first plug-in is later than a version number of the second plug-in.

The plug-in installed in this solution may be an update plug-in corresponding to a plug-in included in a locally installed application.

Further, before that an electronic device receives a first user operation, the method includes:

The electronic device sends a request to the server at a preset time interval, to determine whether the update plug-in corresponding to the at least one plug-in included in the first application locally installed in the electronic device is released in the server.

When the server releases an update plug-in corresponding to a sixth plug-in included in the first application locally installed in the electronic device, the electronic device detects whether a version number of the update plug-in is later than a version number of the sixth plug-in. The at least one plug-in includes the sixth plug-in.

The electronic device displays a first user interface if the version number of the update plug-in is later than the version number of the sixth plug-in. The first user interface is used to indicate the user to trigger the first user operation.

Optionally, the first plug-in is a new plug-in of the first application.

The plug-in installed in this solution may alternatively be a plug-in that is not included in the locally installed application, that is, a new plug-in of the application.

Optionally, that the electronic device installs the first plug-in includes: The electronic device installs a class loader of the first plug-in. That the electronic device installs a class loader of the first plug-in includes:

The electronic device creates an initial class loader of the first plug-in.

The electronic device determines whether an isolated Split attribute is configured for the first plug-in.

If the isolated Split attribute is configured for the first plug-in, the electronic device obtains a storage path of a dynamic library file of the first plug-in.

The electronic device adds the storage path of the dynamic library file to the initial class loader, and obtains the class loader of the first plug-in.

When detecting that the isolated Split attribute is configured for the plug-in, the electronic device obtains the storage path of the dynamic library file of the plug-in, and adds the storage path of the dynamic library file to the class loader, to support the plug-in in accessing the dynamic library file inside the plug-in.

Optionally, the method further includes:

When the electronic device detects an instruction to upgrade a system, the electronic device obtains a first system installation package from the server. The first system installation package includes an installation package of at least one application, the at least one application includes the first application, an installation package of the first application includes a third plug-in, the at least one plug-in that is included in the installed first application and stored in the electronic device includes a fourth plug-in and a fifth plug-in, the third plug-in, the fourth plug-in, and the fifth plug-in are plug-ins with different version numbers but a same identifier, the fourth plug-in is stored in a preset partition of the electronic device, the fifth plug-in is stored in an installation partition of the electronic device, each plug-in carries an identifier, and plug-ins corresponding to a same function icon have a same identifier.

The electronic device detects whether a version number of the third plug-in is later than version numbers of all plug-ins that are included in the installed first application and stored in the electronic device and whose identifiers are the same as an identifier of the third plug-in.

If yes, the electronic device detects whether a major version number of the third plug-in is the same as the major version number of the first plug-in framework.

If the major version number of the third plug-in is the same as the major version number of the first plug-in framework, the electronic device installs the third plug-in.

According to this embodiment of this application, after completing an over-the-air technology update space download technology (OTA upgrade for short), the electronic device can correspondingly upgrade a version of each plug-in of an application to the latest version, so as to resolve a weakness in the conventional technology that versions of some plug-ins are downgraded after the OTA upgrade.

Optionally, the installation package of the first application further includes a second plug-in framework, the first plug-in framework and the second plug-in framework are plug-in frameworks of different version numbers, and the method further includes:

The electronic device detects whether a version number of the second plug-in framework is later than a version number of the first plug-in framework.

If yes, the electronic device installs the second plug-in framework.

According to this embodiment of this application, after completing the OTA upgrade, the electronic device can correspondingly upgrade a version of a plug-in framework of an application to the latest version, so as to resolve a weakness in the conventional technology that the version is downgraded after the OTA upgrade.

Optionally, the first plug-in is an artificial intelligence AI plug-in.

Optionally, the artificial intelligence AI plug-in includes one or more of the following: a facial recognition plug-in, an image super-resolution plug-in, an intent recognition plug-in, a text translation plug-in, a speech recognition plug-in, a head unit voice wakeup plug-in, and a head unit speech recognition plug-in.

This solution may be applied to an artificial intelligence (Artificial Intelligence, AI) terminal, and may be applied to an artificial intelligence plug-in.

According to a second aspect, an embodiment of this application provides a plug-in installation method. The method includes:

When an electronic device detects an instruction to upgrade a system, the electronic device obtains a first system installation package from a server. The first system installation package includes an installation package of at least one application, the at least one application includes a first application, the first application includes a first plug-in framework and at least one plug-in associated with the first plug-in framework, a major version number of each of the at least one plug-in is the same as a major version number of the first plug-in framework, each of the at least one plug-in has a second version number corresponding to the plug-in, the first plug-in framework has a first version number, both the first version number and the second version number include a major version number, a sub version number, and a phase version number, an installation package of the first application includes a third plug-in, the at least one plug-in that is included in the installed first application and stored in the electronic device includes a fourth plug-in and a fifth plug-in, the third plug-in, the fourth plug-in, and the fifth plug-in are plug-ins with different version numbers but a same identifier, the fourth plug-in is stored in a preset partition of the electronic device, the fifth plug-in is stored in an installation partition of the electronic device, each plug-in carries an identifier, and plug-ins corresponding to a same function icon have a same identifier.

The electronic device detects whether a version number of the third plug-in is later than version numbers of all plug-ins that are included in the installed first application and stored in the electronic device and whose identifiers are the same as an identifier of the third plug-in.

If yes, the electronic device detects whether a major version number of the third plug-in is the same as the major version number of the first plug-in framework.

If the major version number of the third plug-in is the same as the major version number of the first plug-in framework, the electronic device installs the third plug-in.

According to this embodiment of this application, after completing an over-the-air technology update space download technology (OTA upgrade for short), the electronic device can correspondingly upgrade a version of each plug-in of an application to the latest version, so as to resolve a weakness in the conventional technology that versions of some plug-ins are downgraded after the OTA upgrade.

Optionally, the installation package of the first application further includes a second plug-in framework, the first plug-in framework and the second plug-in framework are plug-in frameworks of different version numbers, and the method further includes:

The electronic device detects whether a version number of the second plug-in framework is later than a version number of the first plug-in framework.

If yes, the electronic device installs the second plug-in framework.

According to this embodiment of this application, after completing the OTA upgrade, the electronic device can correspondingly upgrade a version of a plug-in framework of an application to the latest version, so as to resolve a weakness in the conventional technology that the version is downgraded after the OTA upgrade.

Optionally, the third plug-in is an artificial intelligence AI plug-in.

Optionally, the artificial intelligence AI plug-in includes one or more of the following: a facial recognition plug-in, an image super-resolution plug-in, an intent recognition plug-in, a text translation plug-in, a speech recognition plug-in, a head unit voice wakeup plug-in, and a head unit speech recognition plug-in.

This solution may be applied to an artificial intelligence (Artificial Intelligence, AI) terminal, and may be applied to an artificial intelligence plug-in.

Optionally, that the electronic device installs the third plug-in includes: The electronic device installs a class loader of the third plug-in. That the electronic device installs a class loader of the third plug-in includes:

The electronic device creates an initial class loader of the third plug-in.

The electronic device determines whether an isolated Split attribute is configured for the third plug-in.

If the isolated Split attribute is configured for the third plug-in, the electronic device obtains a storage path of a dynamic library file of the third plug-in.

The electronic device adds the storage path of the dynamic library file to the initial class loader, and obtains the class loader of the third plug-in.

According to a third aspect, an embodiment of this application provides an apparatus, including one or more processors and one or more memories. The one or more memories are coupled to the one or more processors, the one or more memories are configured to store computer program code, the computer program code includes computer instructions, and when the one or more processors execute the computer instructions, the apparatus is enabled to perform the following operations:

When the one or more processors execute the computer instructions, the apparatus is enabled to perform the following operations:

receiving a first user operation, where the first user operation is used to request to install a first plug-in related to a first application, the first application is an application locally installed in the apparatus, the first application includes a first plug-in framework and at least one plug-in associated with the first plug-in framework, a major version number of each of the at least one plug-in is the same as a major version number of the first plug-in framework, each of the at least one plug-in has a second version number corresponding to the plug-in, the first plug-in framework has a first version number, both the first version number and the second version number include a major version number, a sub version number, and a phase version number, and the first plug-in is different from the at least one plug-in;

receiving the first plug-in from a server in response to the first user operation;

detecting whether a major version number of the first plug-in is the same as the major version number of the first plug-in framework; and if yes, installing the first plug-in.

Optionally, a phase version number of the first plug-in is different from a phase version number of the first plug-in framework.

The apparatus further performs the following operation: The at least one plug-in includes a second plug-in, and the first plug-in is an update plug-in corresponding to the second plug-in.

The apparatus further performs the following operation: The first plug-in is a new plug-in of the first application.

The apparatus further performs the following operations:
creating an initial class loader of the first plug-in;
determining whether an isolated Split attribute is configured for the first plug-in;
if the isolated Split attribute is configured for the first plug-in, obtaining a storage path of a dynamic library file of the first plug-in; and
adding the storage path of the dynamic library file to the initial class loader, and obtaining a class loader of the first plug-in.

The apparatus further performs the following operation: when detecting an instruction to upgrade a system, obtaining a first system installation package from the server, where the first system installation package includes an installation package of at least one application, the at least one application includes the first application, an installation package of the first application includes a third plug-in, the at least one plug-in that is included in the installed first application and stored in the apparatus includes a fourth plug-in and a fifth plug-in, the third plug-in, the fourth plug-in, and the fifth plug-in are plug-ins with different version numbers but a same identifier, the fourth plug-in is stored in a preset partition of the apparatus, the fifth plug-in is stored in an installation partition of the apparatus, each plug-in carries an identifier, and plug-ins corresponding to a same function icon have a same identifier;

detecting whether a version number of the third plug-in is later than version numbers of all plug-ins that are included in the installed first application and stored in the apparatus and whose identifiers are the same as an identifier of the third plug-in;

if yes, detecting whether a major version number of the third plug-in is the same as the major version number of the first plug-in framework; and if the major version number of the third plug-in is the same as the major version number of the first plug-in framework, installing the third plug-in.

The installation package of the first application further includes a second plug-in framework, the first plug-in framework and the second plug-in framework are plug-in frameworks of different version numbers, and the apparatus further performs the following operations:

detecting whether a version number of the second plug-in framework is later than a version number of the first plug-in framework; and if yes, installing the second plug-in framework.

The first plug-in is an artificial intelligence AI plug-in.

The artificial intelligence AI plug-in includes one or more of the following: a facial recognition plug-in, an image super-resolution plug-in, an intent recognition plug-in, a text translation plug-in, a speech recognition plug-in, a head unit voice wakeup plug-in, and a head unit speech recognition plug-in.

The apparatus is a terminal device or a part of a terminal device.

According to a fourth aspect, an embodiment of this application further provides an apparatus, including one or more processors and one or more memories. The one or more memories are coupled to the one or more processors, the one or more memories are configured to store computer program code, and the computer program code includes computer instructions.

When the one or more processors execute the computer instructions, the apparatus is enabled to perform the following operations:

when detecting an instruction to upgrade a system, obtaining a first system installation package from a server, where the first system installation package includes an installation package of at least one application, the at least one application includes a first application, the first application includes a first plug-in framework and at least one plug-in associated with the first plug-in framework, a major version number of each of the at least one plug-in is the same as a major version number of the first plug-in framework, each of the at least one plug-in has a second version number corresponding to the plug-in, the first plug-in framework has a first version number, both the first version number and the second version number include a major version number, a sub version number, and a phase version number, an installation package of the first application includes a third plug-in, the at least one plug-in that is included in the installed first application and stored in the apparatus includes a fourth plug-in and a fifth plug-in, the third plug-in, the fourth plug-in, and the fifth plug-in are plug-ins with different version numbers but a same identifier, the fourth plug-in is stored in a preset partition of the apparatus, the fifth plug-in is stored in an installation partition of the apparatus, each plug-in carries an identifier, and plug-ins corresponding to a same function icon have a same identifier;

detecting whether a version number of the third plug-in is later than version numbers of all plug-ins that are included in the installed first application and stored in the apparatus and whose identifiers are the same as an identifier of the third plug-in;

if yes, detecting whether a major version number of the third plug-in is the same as the major version number of the first plug-in framework; and if the major version number of the third plug-in is the same as the major version number of the first plug-in framework, installing the third plug-in.

Optionally, the installation package of the first application further includes a second plug-in framework, the first plug-in framework and the second plug-in framework are plug-in frameworks of different version numbers, and the apparatus further performs the following operations:

detecting whether a version number of the second plug-in framework is later than a version number of the first plug-in framework; and if yes, installing the second plug-in framework.

Optionally, the third plug-in is an artificial intelligence AI plug-in.

The apparatus further performs the following operations:
creating an initial class loader of the third plug-in;
determining whether an isolated Split attribute is configured for the third plug-in;

if the isolated Split attribute is configured for the third plug-in, obtaining a storage path of a dynamic library file of the third plug-in; and adding the storage path of the dynamic library file to the initial class loader, and obtaining a class loader of the third plug-in.

The apparatus is a terminal device or a part of a terminal device.

According to a fifth aspect, this application provides a computer storage medium, including computer instructions. When the computer instructions are run on an electronic device, the electronic device is enabled to perform the method according to any one of the possible implementations in the first aspect and/or the possible implementations in the second aspect.

According to a sixth aspect, an embodiment of this application provides a computer program product. When the computer program product runs on a computer, the computer is enabled to perform the method according to any one of the possible implementations in the first aspect and/or the possible implementations in the second aspect.

It may be understood that the apparatus according to the third aspect, the apparatus according to the fourth aspect, the computer storage medium according to the fifth aspect, or the computer program product according to the sixth aspect is configured to perform the method according to any one of the possible implementations in first aspect and the method according to any one of the possible implementations in the second aspect. Therefore, for beneficial effects that can be achieved, refer to beneficial effects in a corresponding method. Details are not described herein again.

BRIEF DESCRIPTION OF THE DRAWINGS

To describe the technical solutions in embodiments of this application or in the background more clearly, the following briefly describes the accompanying drawings in embodiments of this application or in the background.

FIG. 4B to FIG. 4D-2 are respectively schematic diagrams of human-machine interaction interfaces according to an embodiment of this application;

FIG. 5A to FIG. 5B-2 are respectively schematic diagrams of other human-machine interaction interfaces according to an embodiment of this application;

DETAILED DESCRIPTION OF ILLUSTRATIVE EMBODIMENTS

To make persons skilled in the art understand the solutions in this application better, the following clearly and completely describes the technical solutions in the embodiments of this application with reference to the accompanying drawings in the embodiments of this application. It is clearly that the described embodiments are merely a part rather than all of the embodiments of this application. All other embodiments obtained by persons of ordinary skill in the art based on the embodiments of this application without creative efforts shall fall within the protection scope of this application.

Figure 1:
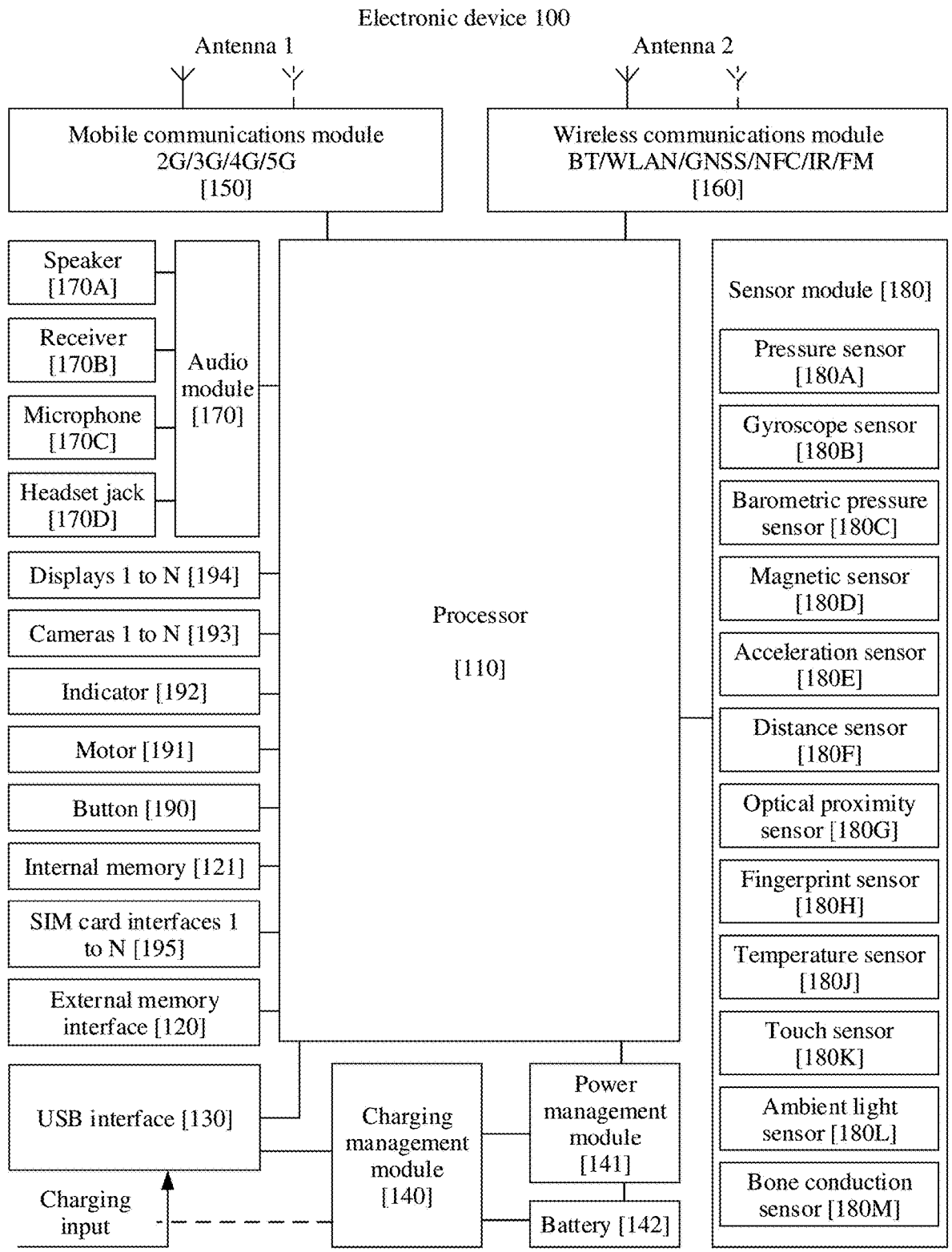
FIG. 1 is a schematic diagram of a structure of an electronic device 100 according to an embodiment of this application.

An electronic device in the embodiments of this application is first described. FIG. 1 is a schematic diagram of a structure of an electronic device 100 according to an embodiment of this application.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that a structure shown in this embodiment of the present invention does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by using hardware, software, or a combination of software and hardware.

The processor no may include one or more processing units. For example, the processor no may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the electronic device 100. The controller may generate an operation control signal based on instruction operation code and a time sequence signal, to complete control of instruction reading and instruction execution.

A memory may be further disposed in the processor no, and is configured to store instructions and data. In some embodiments, the memory in the processor no is a cache. The memory may store instructions or data just used or cyclically used by the processor no. If the processor no needs to use the instructions or the data again, the processor no may directly invoke the instructions or the data from the memory. This avoids repeated access, reduces waiting time of the processor no, and improves system efficiency.

In some embodiments, the processor no may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (derail clock line, SCL). In some embodiments, the processor no may include a plurality of groups of I2C buses. The processor no may be separately coupled to the touch sensor 180K, a charger, a flashlight, the camera 193, and the like through different I2C bus interfaces. For example, the processor no may be coupled to the touch sensor 180K through an I2C interface, so that the processor no communicates with the touch sensor 180K through the I2C bus interface, to implement a touch function of the electronic device 100.

The I2S interface may be configured to perform audio communication. In some embodiments, the processor no may include a plurality of groups of I2S buses. The processor no may be coupled to the audio module 170 through the I2S bus, to implement communication between the processor no and the audio module 170. In some embodiments, the audio module 170 may transmit an audio signal to the wireless communications module 160 through the I2S interface, to implement a function of answering a call through a Bluetooth headset.

The PCM interface may also be used to perform audio communication, and sample, quantize, and code an analog signal. In some embodiments, the audio module 170 may be coupled to the wireless communications module 160 through a PCM bus interface. In some embodiments, the audio module 170 may alternatively transmit an audio signal to the wireless communications module 160 through the PCM interface, to implement a function of answering a call through a Bluetooth headset. Both the I2S interface and the PCM interface may be configured to perform the audio communication.

The UART interface is a universal serial data bus, and is used to perform asynchronous communication. The bus may be a two-way communications bus. The bus switches to-be-transmitted data between serial communication and parallel communication. In some embodiments, the UART interface is usually used to connect the processor no to the wireless communications module 160. For example, the processor no communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music through the Bluetooth headset.

The MIPI interface may be configured to connect the processor no to a peripheral component such as the display 194 or the camera 193. The MIPI interface includes a camera serial interface (camera serial interface, CSI), a display serial interface (display serial interface, DSI), or the like. In some embodiments, the processor no communicates with the camera 193 through the CSI, to implement a photographing function of the electronic device 100. The processor no communicates with the display 194 through the DSI, to implement a display function of the electronic device 100.

The GPIO interface may be configured by using software. The GPIO interface may be configured as a control signal, or may be configured as a data signal. In some embodiments, the GPIO interface may be configured to connect the processor no to the camera 193, the display 194, the wireless communications module 160, the audio module 170, the sensor module 180, or the like. The GPIO interface may be further configured as the I2C interface, the I2S interface, the UART interface, the MIPI interface, or the like.

The USB interface 130 is an interface that conforms to a USB standard specification, and may be specifically a mini USB interface, a micro USB interface, a USB Type C interface, or the like. The USB interface 130 may be configured to connect to a charger to charge the electronic device 100, or may be configured to transmit data between the electronic device 100 and a peripheral device, or may be configured to connect to a headset, to play audio through the headset. The interface may be further configured to connect to another electronic device such as an AR device.

It may be understood that an interface connection relationship between the modules that is shown in this embodiment of the present invention is merely an example for description, and constitutes no limitation on the structure of the electronic device 100. In other embodiments of this application, the electronic device 100 may alternatively use an interface connection mode different from that in the foregoing embodiment, or use a combination of a plurality of interface connection modes.

The charging management module 140 is configured to receive a charging input from a charger. The charger may be a wireless charger or a wired charger. In some embodiments of wired charging, the charging management module 140 may receive a charging input from the wired charger through the USB interface 130. In some embodiments of wireless charging, the charging management module 140 may receive a wireless charging input through a wireless charging coil of the electronic device 100. The charging management module 140 may further supply power to the electronic device through the power management module 141 while charging the battery 142.

The power management module 141 is configured to connect the battery 142, the charging management module 140, and the processor no. The power management module 141 receives an input from the battery 142 and/or the charging management module 140, and supplies power to the processor no, the internal memory 121, an external memory, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor no. In some other embodiments, the power management module 141 and the charging management module 140 may alternatively be disposed in a same device.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may be further multiplexed to improve antenna utilization. For example, the antenna 1 may be multiplexed as a diversity antenna in a wireless local area network. In some other embodiments, an antenna may be used in combination with a tuning switch.

The mobile communications module 150 can provide a solution, applied to the electronic device 100, to wireless communication including 2G, 3G, 4G, 5G, and the like. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit a processed electromagnetic wave to the modem processor for demodulation. The mobile communications module 150 may further amplify a signal modulated by the modem processor, and convert the signal into an electromagnetic wave by using the antenna 1 for radiation. In some embodiments, at least some function modules of the mobile communications module 150 may be disposed in the processor no. In some embodiments, at least some function modules of the mobile communications module 150 may be disposed in the same device as at least some modules of the processor no.

The modem processor may include a modulator and a demodulator. The modulator is configured to modulate a to-be-sent low-frequency baseband signal into a medium-frequency or high-frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transfers an obtained signal to the application processor. The application processor outputs a sound signal through an audio device (which is not limited to the speaker 170A, the receiver 170B, or the like), or displays an image or a video through the display 194. In some embodiments, the modem processor may be an independent component. In some other embodiments, the modem processor may be independent of the processor no, and is disposed in the same device as the mobile communications module 150 or another function module.

The wireless communications module 160 may provide a wireless communication solution that is applied to the electronic device 100 and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, and an infrared (infrared, IR) technology. The wireless communications module 160 may be one or more components integrating at least one communications processing module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, in the electronic device 100, the antenna 1 and the mobile communications module 150 are coupled, and the antenna 2 and the wireless communications module 160 are coupled, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device 100 implements a display function by using the GPU, the display 194, the application processor, and the like. The GPU is a microprocessor for image processing, and is connected to the display 194 and the application processor. The GPU is configured to perform mathematical and geometric calculation, and render an image. The processor no may include one or more GPUs, which execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device 100 may include one or N displays 194, where N is a positive integer greater than 1.

The electronic device 100 may implement a photographing function through the ISP, the camera 193, the video codec, the GPU, the display 194, the application processor, and the like.

The ISP is configured to process data fed back by the camera 193. For example, during photographing, a shutter is pressed, and a ray of light is transmitted to a photosensitive element of a camera through a lens. An optical signal is converted into an electrical signal. The photosensitive element of the camera transmits the electrical signal to the ISP for processing, and converts the electrical signal into a visible image. The ISP may further perform algorithm optimization on noise, brightness, and complexion of the image. The ISP may further optimize parameters such as exposure and color temperature of a photographing scenario. In some embodiments, the ISP may be disposed in the camera 193.

The camera 193 is configured to capture a static image or a video. An optical image of an object is generated through a lens, and is projected onto a photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation on frequency energy.

The video codec is configured to compress or decompress a digital video. The electronic device 100 may support one or more video codecs. In this way, the electronic device 100 can play or record videos in a plurality of coding formats, for example, moving picture experts group (moving picture experts group, MPEG-1, MPEG-2, MPEG-3, and MPEG-4.

The NPU is a neural-network (neural-network, NN) computing processor, quickly processes input information by referring to a structure of a biological neural network, for example, by referring to a transfer mode between human brain neurons, and may further continuously perform self-learning. Applications such as intelligent cognition of the electronic device 100, for example, image recognition, facial recognition, speech recognition, and text understanding, may be implemented through the NPU.

The external memory interface 120 may be configured to connect to an external memory card, for example, a micro SD card, to extend a storage capability of the electronic device 100. The external storage card communicates with the processor no through the external memory interface 120, to implement a data storage function. For example, files such as music and videos are stored in the external storage card.

The internal memory 121 may be configured to store computer-executable program code. The executable program code includes instructions. The processor no performs various function applications and data processing of the electronic device 100 by running the instructions stored in the internal memory 121. The internal memory 121 may include a program storage area and a data storage area. The program storage area may store an operating system, an application required by at least one function (such as a sound playing function or an image playing function), and the like. The data storage area may store data (for example, audio data and an address book) and the like created when the electronic device 100 is used. In addition, the internal memory 121 may include a high-speed random access memory, and may further include a nonvolatile memory such as at least one magnetic disk storage device, a flash memory, or a universal flash storage (universal flash storage, UFS).

The electronic device 100 may implement an audio function such as music playing and recording through the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to code and decode an audio signal. In some embodiments, the audio module 170 may be disposed in the processor 110, or some function modules in the audio module 170 are disposed in the processor 110.

The speaker 170A, also referred to as a "loudspeaker", is configured to convert an audio electrical signal into a sound signal. The electronic device 100 may be used to listen to music or answer a call in a hands-free mode through the speaker 170A.

The receiver 170B, also referred to as an "earpiece", is configured to convert an audio electrical signal into a sound signal. When a call is answered or a voice message is received through the electronic device 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound by moving a human mouth close to the microphone 170C, to input the sound signal to the microphone 170C. At least one microphone 170C may be disposed in the electronic device 100. In some other embodiments, two microphones 170C may be disposed in the electronic device 100, to implement a noise reduction function, in addition to collecting the sound signal. In some other embodiments, three, four, or more microphones 170C may alternatively be disposed in the electronic device 100, to collect a sound signal, implement noise reduction, and identify a sound source, to implement a directional recording function and the like.

The headset jack 170D is configured to connect to a wired headset. The headset jack 170D may be the USB interface 130, or may be a 3.5 mm open mobile terminal platform (open mobile terminal platform, OMTP) standard interface, or a cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on a capacitance change. When a touch operation is performed on the display 194, the electronic device 100 detects intensity of the touch operation by using the pressure sensor 180A. The electronic device 100 may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on an icon of Messages, an instruction for viewing an SMS message is executed. When a touch operation whose touch operation intensity is greater than or equal to the first pressure threshold is performed on an icon of Messages, an instruction for creating an SMS message is executed.

The gyroscope sensor 180B may be configured to determine a motion posture of the electronic device 100. In some embodiments, an angular velocity of the electronic device 100 around three axes (namely, axes x, y, and z) may be determined by using the gyroscope sensor 180B. The gyroscope sensor 180B may be configured to perform image stabilization during photographing. For example, when the shutter is pressed, the gyroscope sensor 180B detects an angle at which the electronic device 100 shakes, calculates, based on the angle, a distance for which a lens module needs to compensate, and allows the lens to eliminate the shake of the electronic device 100 through reverse motion, to implement image stabilization. The gyroscope sensor 180B may also be used in a navigation scenario and a somatic game scenario.

The barometric pressure sensor 180C is configured to measure barometric pressure. In some embodiments, the electronic device 100 calculates an altitude based on a barometric pressure value measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a flip phone, the electronic device 100 may detect opening and closing of a flip cover based on the magnetic sensor 180D. Further, a feature such as automatic unlocking of the flip cover is set based on a detected opening or closing state of the leather case or a detected opening or closing state of the flip cover.

The acceleration sensor 180E may detect accelerations in various directions (usually on three axes) of the electronic device 100, and may detect magnitude and a direction of gravity when the electronic device 100 is still. The acceleration sensor 180E may be further configured to identify a posture of the electronic device, and applied to an application such as switching between landscape mode and portrait mode or a pedometer.

The distance sensor 180F is configured to measure a distance. The electronic device 100 may measure the distance in an infrared manner or a laser manner. In some embodiments, in a photographing scenario, the electronic device 100 may measure a distance by using the distance sensor 180F to implement quick focusing.

The optical proximity sensor 180G may include a light-emitting diode (LED) and an optical detector, for example, a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 degrades performance of a processor near the temperature sensor 180J, to reduce power consumption for thermal protection. In some other embodiments, when the temperature is less than another threshold, the electronic device 100 heats the battery 142 to prevent the electronic device 100 from being shut down abnormally due to a low temperature. In some other embodiments, when the temperature is less than still another threshold, the electronic device 100 boosts an output voltage of the battery 142 to avoid abnormal shutdown due to a low temperature.

The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation on or near the touch sensor 180K. The touch sensor may transfer the detected touch operation to the application processor, to determine a type of a touch event. A visual output related to the touch operation may be provided through the display 194. In some other embodiments, the touch sensor 180K may alternatively be disposed on a surface of the electronic device wo at a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, and receive a blood pressure beating signal. In some embodiments, the bone conduction sensor 180M may alternatively be disposed in a headset, to obtain a bone conduction headset. The audio module 170 may obtain a voice signal through parsing based on the vibration signal that is of the vibration bone of the vocal part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device wo may receive a key input, and generate a key signal input related to user setting and function control of the electronic device 100.

The motor 191 may generate a vibration prompt. The motor 191 may be configured to provide an incoming call vibration prompt and a touch vibration feedback. For example, touch operations performed on different applications (for example, photographing and audio playback) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may alternatively be customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type, or may be of different types. The SIM card interface 195 may be compatible with different types of SIM cards. The SIM card interface 195 may also be compatible with the external storage card. The electronic device 100 interacts with a network by using the SIM card, to implement functions such as calling and data communication. In some embodiments, the electronic device 100 uses an eSIM, that is, an embedded SIM card. The eSIM card may be embedded in the electronic device 100, and cannot be separated from the electronic device 100.

A software system of the electronic device 100 may use a layered architecture, an event-driven architecture, a microkernel architecture, a micro service architecture, or a cloud architecture. In this embodiment of the present invention, an Android system of the layered architecture is used as an example to describe the software structure of the electronic device 100.

Figure 2:
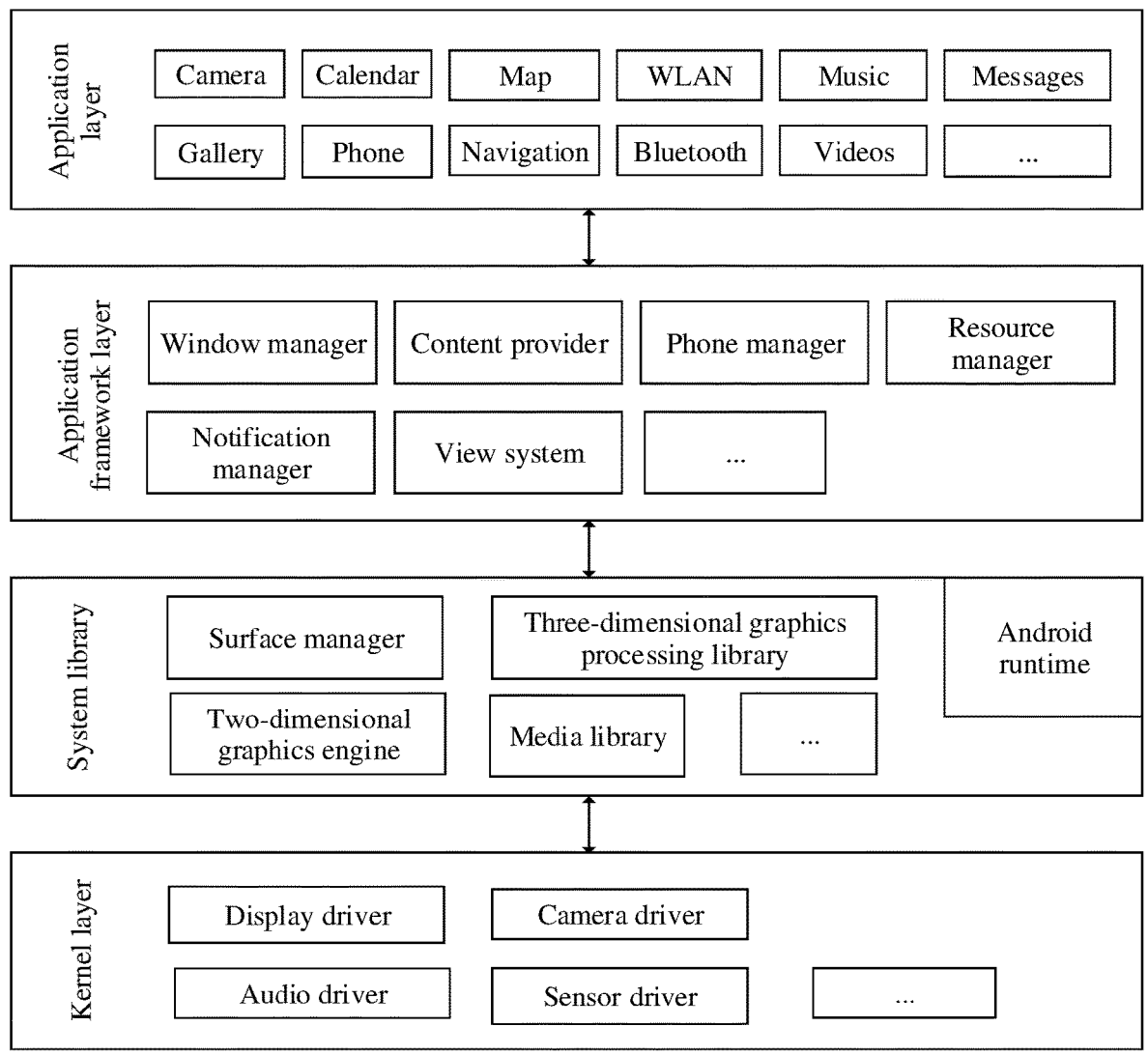
FIG. 2 is a block diagram of a software structure of an electronic device 100 according to an embodiment of this application.

FIG. 2 is a block diagram of a software structure of the electronic device 100 in this embodiment of this application.

In a layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

As shown in FIG. 2, the application packages may include applications such as Camera, Gallery, Calendar, Phone, Map, Navigation, WLAN, Bluetooth, Music, Videos, and Messages.

The application framework layer provides an application programming interface (application programming interface, API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to: store and obtain data, and enable the data to be accessed by an application. The data may include a video, an image, audio, calls that are made and received, a browsing history and bookmarks, a phone book, and the like.

The view system includes visual controls, such as a control for displaying a text and a control for displaying an image. The view system may be configured to construct an application. A display interface may include one or more views. For example, a display interface including an SMS notification icon may include a text display view and an image display view.

The phone manager is configured to provide a communication function of the electronic device 100, for example, management of a call status (including answering or declining).

The resource manager provides, for an application, various resources such as a localized character string, an icon, an image, a layout file, and a video file.

The notification manager enables an application to display notification information in the status bar, and may be configured to convey a notification message. The notification manager may automatically disappear after a short pause without requiring a user interaction. For example, the notification manager is configured to provide notifications of download completing, a message prompt, and the like. The notification manager may be a notification that appears in a top status bar of the system in a form of a graph or a scroll bar text, for example, a notification of an application running on the background, or may be a notification that appears on the screen in a form of a dialog window. For example, text information is prompted in the status bar, a prompt tone is produced, the electronic device vibrates, or the indicator light blinks.

The Android runtime includes a core library and a virtual machine. The Android runtime is responsible for scheduling and management of the Android system.

The kernel library includes two parts: one part is a function that needs to be invoked by a Java language, and the other part is a kernel library of Android.

The application layer and the application framework layer run on the virtual machine. The virtual machine executes Java files of the application layer and the application framework layer as binary files. The virtual machine is configured to implement functions such as object lifecycle management, stack management, thread management, security and exception management, and garbage collection.

The system library may include a plurality of function modules, for example, a surface manager (surface manager), a media library (Media Library), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, a static image file, and the like. The media library may support a plurality of audio and video coding formats, such as MPEG-4, H.264, MP3, AAC, AMR, JPG, and PNG.

The three-dimensional graphics processing library is configured to implement three-dimensional graphics drawing, image rendering, compositing, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes examples of working procedures of software and hardware of the electronic device 100 with reference to a photographing scenario.

When the touch sensor 180K receives a touch operation, a corresponding hardware interruption is sent to the kernel layer. The kernel layer processes the touch operation into an original input event (including information such as touch coordinates and a time stamp of the touch operation). The original input event is stored at the kernel layer. The application framework layer obtains the original input event from the kernel layer, and identifies a control corresponding to the input event. For example, the touch operation is a single-tap touch operation, and a control corresponding to the single-tap operation is a control of a camera application icon. The camera application invokes an interface at the application framework layer to enable the camera application, then enables a camera driver by invoking the kernel layer, and captures a static image or a video through the camera 193.

First, a plug-in installation method in embodiments of this application is described.

Embodiments of this application provide a plug-in installation method. An electronic device receives a to-be-installed plug-in from a server, detects whether a major version number of the to-be-installed plug-in is the same as a major version number of a plug-in framework associated with the to-be-installed plug-in, and installs the plug-in when the major version number of the plug-in is the same as the major version number of the plug-in framework.

In the plug-in installation method, when the major version number of the plug-in is the same as the major version number of the plug-in framework associated with the plug-in, the electronic device installs the plug-in. That is, in this solution, the plug-in can be installed as long as the major version number of the plug-in is the same as the major version number of the plug-in framework.

Compared with a means in which an electronic device needs to install all plug-ins of an application corresponding to a plug-in when a user requests to install the plug-in in the conventional technology, this solution meets a requirement of the user for separately downloading and installing different plug-ins, thereby improving user experience. In addition, developers can develop and release plug-ins of different applications separately, which saves a large amount of human resources.

The following describes concepts in embodiments of this application.

(1) Plug-In

After a software project is developed and used, new functions need to be added, which are generally expected to be embedded into a system without modification of an original application. This is called plugging-in, and a new function module is called a plug-in. Plugging-in can greatly reduce coupling between modules, facilitates independent maintenance of each module, and accelerates maintenance and update of a project.

(2) Plug-In Framework

The plug-in framework is a basic function module in a plug-in application, and is responsible for management functions such as download, installation, loading, and uninstallation of a plug-in.

(3) Version Number

The version number generally includes a major version number, a sub version number, and a phase version number.

The major version number corresponds to a first segment of the version number. The major version number is determined by a project. When a function module of the project change greatly, for example, a plurality of modules are added or an overall architecture changes, the major version number changes accordingly.

The sub version number corresponds to a second segment of the version number. When functions are added or changed, for example, permission control or customized view function is added, the sub version number changes.

The phase version number corresponds to a third segment of the version number, and is generally a bug fix or a minor change. A revision can be released after a major bug is fixed.

Each plug-in has a version number corresponding to the plug-in. Each plug-in framework has a version number corresponding to the plug-in framework.

(4) OTA Upgrade

OTA is short for over-the-air technology update. The OTA upgrade is a standard software upgrade mode provided by the Android system. The OTA upgrade may be directly completed online in the electronic device by using only a mobile network or a Wi-Fi network. In addition, the upgrade does not need to back up data. Generally, after the upgrade is completed, the electronic device is automatically restarted to complete the upgrade.

Figure 3A:
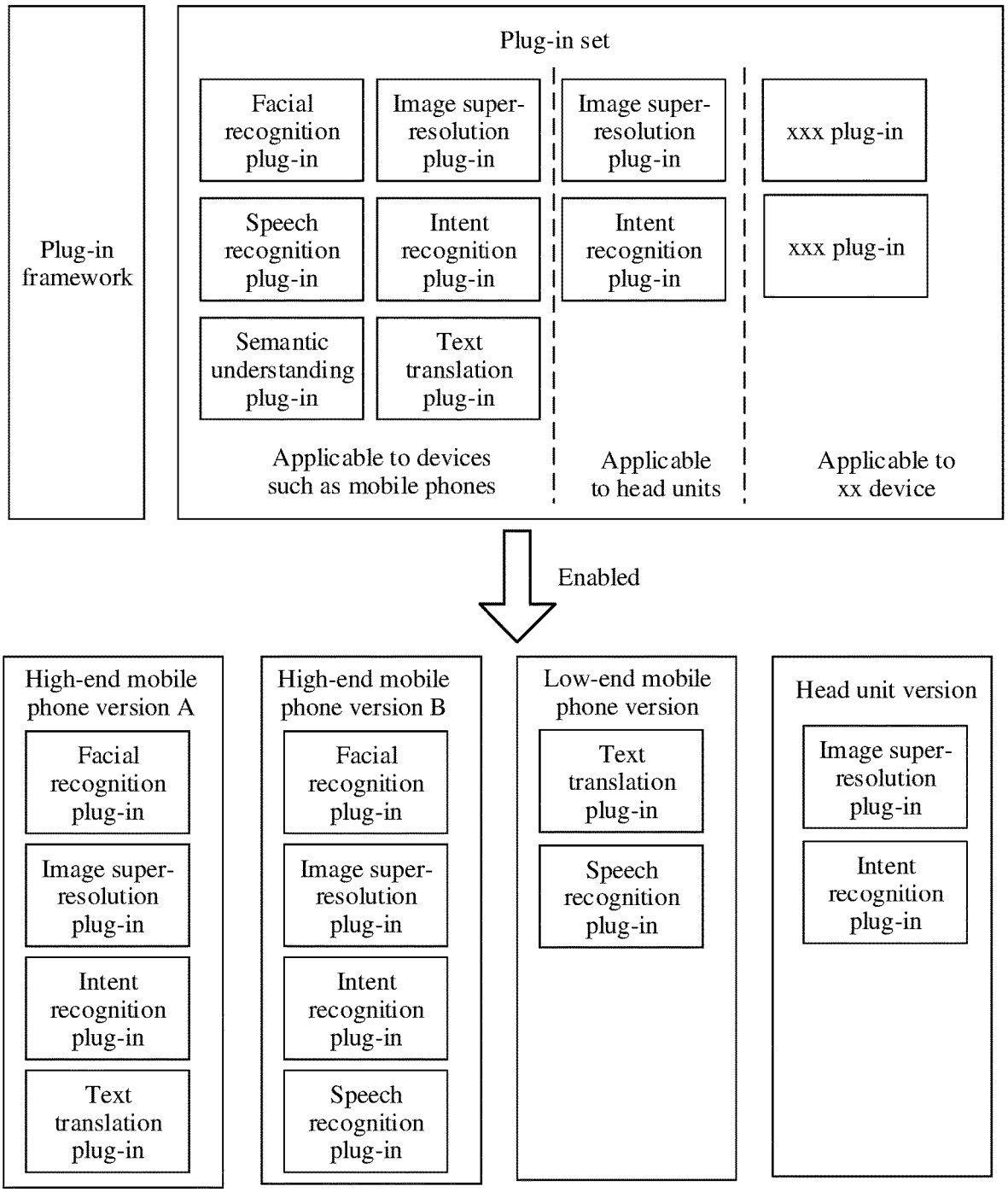
FIG. 3A is a schematic diagram of a plug-in implementation scenario according to an embodiment of this application.

FIG. 3A is a schematic diagram of a plug-in implementation scenario according to an embodiment of this application. Refer to FIG. 3A. In a plug-in architecture, different plug-ins are applicable to different electronic devices. Different electronic devices may obtain different plug-ins based on different requirements to implement different functions.

A facial recognition plug-in, an image super-resolution plug-in, an intent recognition plug-in, a text translation plug-in, and the like are applicable to a version A of a mobile phone. The facial recognition plug-in, the image super-resolution plug-in, the intent recognition plug-in, a speech recognition plug-in, and the like are applicable to a version B of the mobile phone. The speech recognition plug-in and the text translation plug-in are applicable to a low-end mobile phone version. A head unit voice wakeup plug-in and a head unit speech recognition plug-in are applicable to a head unit. The foregoing is merely used as an example, and this solution does not specifically limit a case in which different devices obtain different plug-ins.

The facial recognition plug-in, the image super-resolution plug-in, the intent recognition plug-in, the text translation plug-in, the speech recognition plug-in, the head unit voice wakeup plug-in, and the head unit speech recognition plug-in are all artificial intelligence (Artificial Intelligence, AI) plug-ins. Devices can use the AI plug-ins to implement on-demand deployment of AI capabilities of the devices.

Figure 3B:
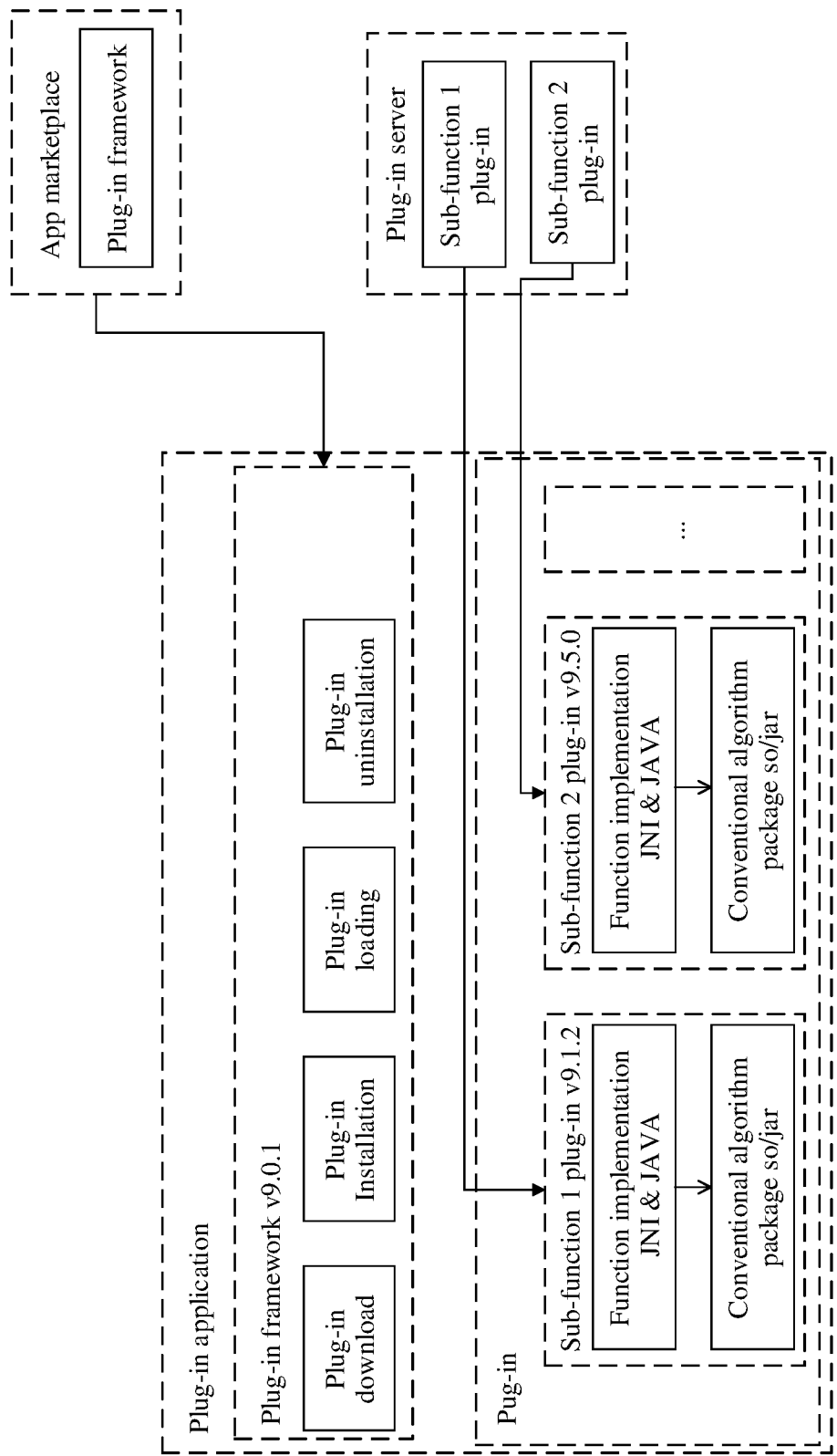
FIG. 3B is a schematic diagram of another plug-in implementation scenario according to an embodiment of this application.

FIG. 3B is a schematic diagram of a plug-in implementation scenario according to an embodiment of this application. An electronic device may obtain different plug-ins from a server, to implement on-demand deployment of the plug-ins. Refer to FIG. 3B. The server may be referred to as a plug-in server or another name. The plug-in server may be a server that releases various plug-ins.

An electronic device may also obtain, from the server, plug-in frameworks separately associated with different plug-ins.

Optionally, the electronic device may obtain the plug-in framework from an app marketplace. The app marketplace may release various plug-in frameworks.

The foregoing embodiment is merely used as an implementation, and this is not specifically limited in this solution.

Figure 4A:
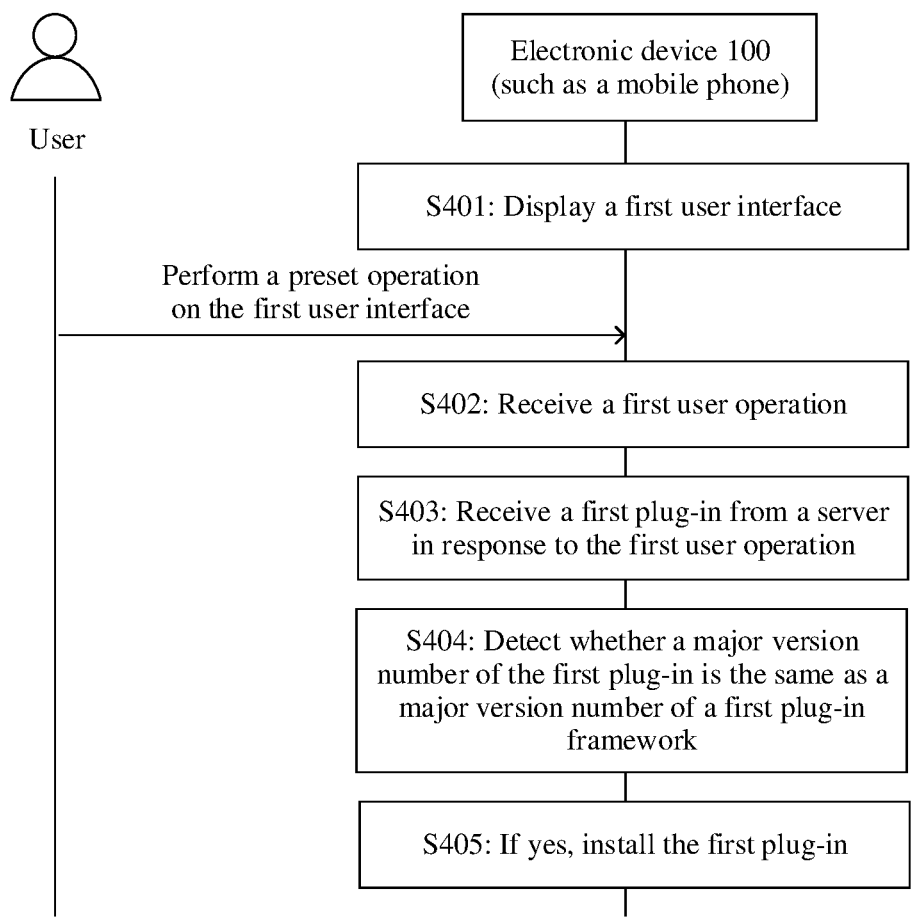
FIG. 4A is a schematic flowchart of a plug-in installation method according to an embodiment of this application.

The following describes a plug-in installation method provided in an embodiment of this application. FIG. 4A is a schematic flowchart of a plug-in installation method according to an embodiment of this application. The method includes steps S401 to S405, and is specifically as follows:

S401: An electronic device displays a first user interface.

Figure 4B:
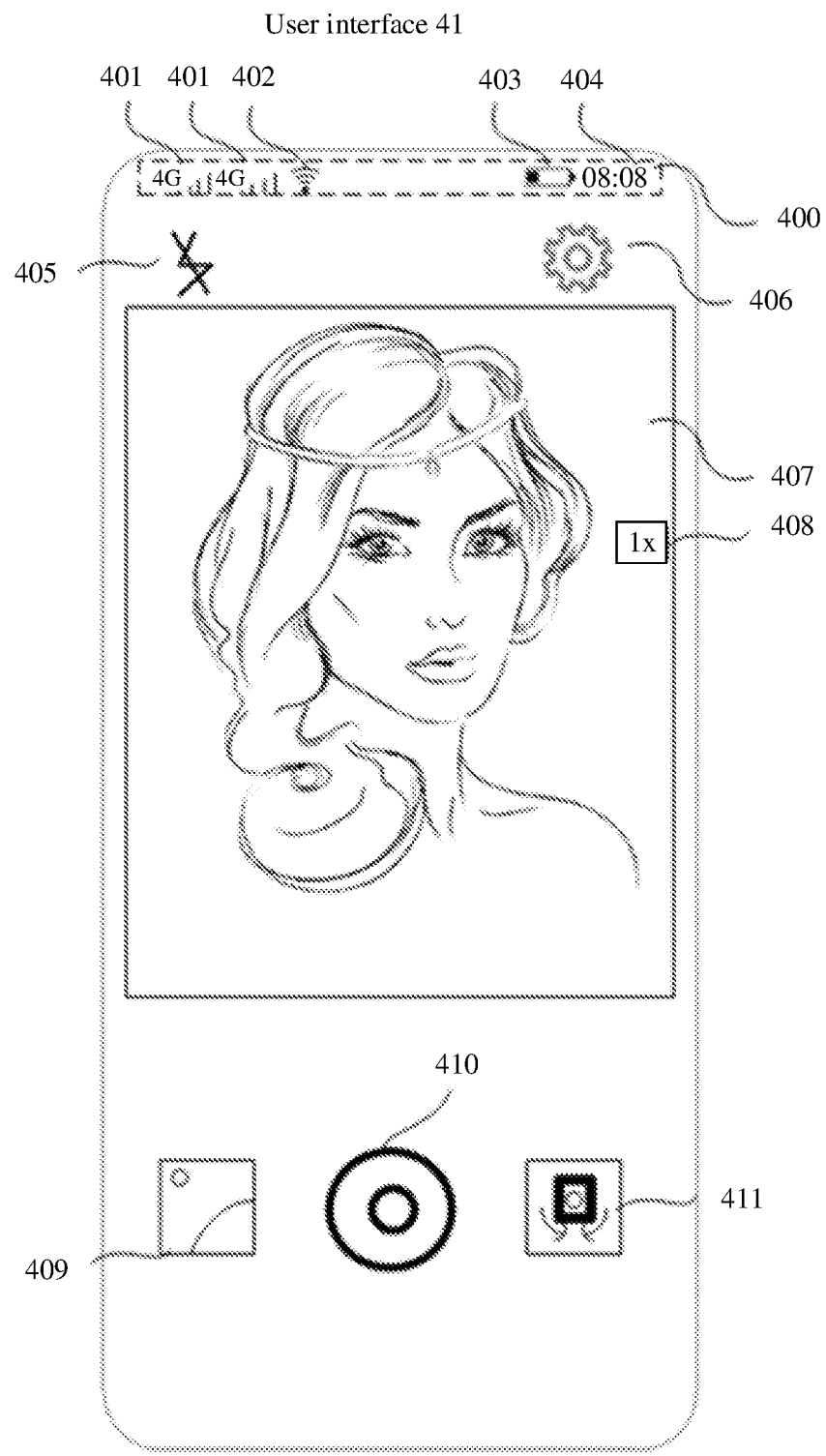

FIG. 4B to FIG. 4D-2 are respectively schematic diagrams of human-machine interaction interfaces according to an embodiment of this application. As shown in FIG. 4B, the electronic device 100 displays a user interface 41. The user interface 41 includes a status bar 400 and a first application interface. The first application may be a camera. The camera is a locally installed application of the electronic device.

The status bar 400 may include one or more signal strength indicators 401 of a mobile communication signal (which may also be referred to as a cellular signal), one or more signal strength indicators 402 of a Wi-Fi signal, a battery status indicator 403, and a time indicator 404.

Display elements of the first application interface include a flash button 405, a camera setting button 406, a viewfinder frame 407, a zoom-in button 408, a picture option 409, a photographing button 410, and a camera switch 411.

When a user taps the flash button 405, the electronic device turns on/off a flash in response to the user operation. When the user taps the zoom-in button 408, the electronic device zooms in a lens in response to the user operation. When the user taps the photographing button 410, the electronic device performs photographing in response to the user operation. When the user taps the camera switch 411, the electronic device switches the camera in response to the user operation.

The camera application includes a plug-in framework and at least one plug-in of the camera application. The at least one plug-in includes a plug-in corresponding to a flash function, a plug-in corresponding to a camera setting function, a plug-in corresponding to a viewfinder frame function, a plug-in corresponding to a zoom-in function, a plug-in corresponding to a picture option function, a plug-in corresponding to a photographing function, a plug-in corresponding to a camera switch function, and the like. The plug-in corresponding to the flash function, the plug-in corresponding to the camera setting function, the plug-in corresponding to the viewfinder frame function, the plug-in corresponding to the zoom-in function, the plug-in corresponding to the picture option function, the plug-in corresponding to the photographing function, and the plug-in corresponding to the camera switch function have a same major version number as that of the plug-in framework of the camera application.

Before step S401, the method may further include:

The electronic device may send a request to a server at a preset time interval, to determine whether an update plug-in corresponding to at least one plug-in included in the first application locally installed in the electronic device is released in the server.

Each plug-in corresponds to a different identifier, and a same plug-in corresponds to a same identifier. For example, flash plug-ins of different versions correspond to a same identifier. The identifier may be a plug-in name splitname or the like.

The electronic device obtains, by separately detecting an identifier of the at least one plug-in and an identifier of the update plug-in, a sixth plug-in that is the same as the identifier of the update plug-in.

If it is detected that the identifier of the update plug-in is the same as an identifier of the sixth plug-in in the at least one plug-in, the electronic device detects whether a version number of the update plug-in is later than a version number of the sixth plug-in. The at least one plug-in includes the sixth plug-in.

If the version number of the update plug-in is later than the version number of the sixth plug-in, step S401 is triggered to be performed.

Specifically, when an update plug-in of the camera application is released, the electronic device detects whether an identifier of the update plug-in of the camera application released by the server is the same as an identifier of each plug-in of the locally installed camera application. When the same identifier exists, the electronic device detects whether a version number of the update plug-in released by the server is later than a version number of a corresponding plug-in that is locally installed and whose identifier is the same as that of the update plug-in.

If the electronic device detects that the identifier of the update plug-in released by the server is the same as an identifier of a locally installed flash plug-in, the electronic device determines that the update plug-in is the flash plug-in. The electronic device detects whether a version number of the flash plug-in released by the server is later than a version number of the locally installed flash plug-in.

Figure 4C:
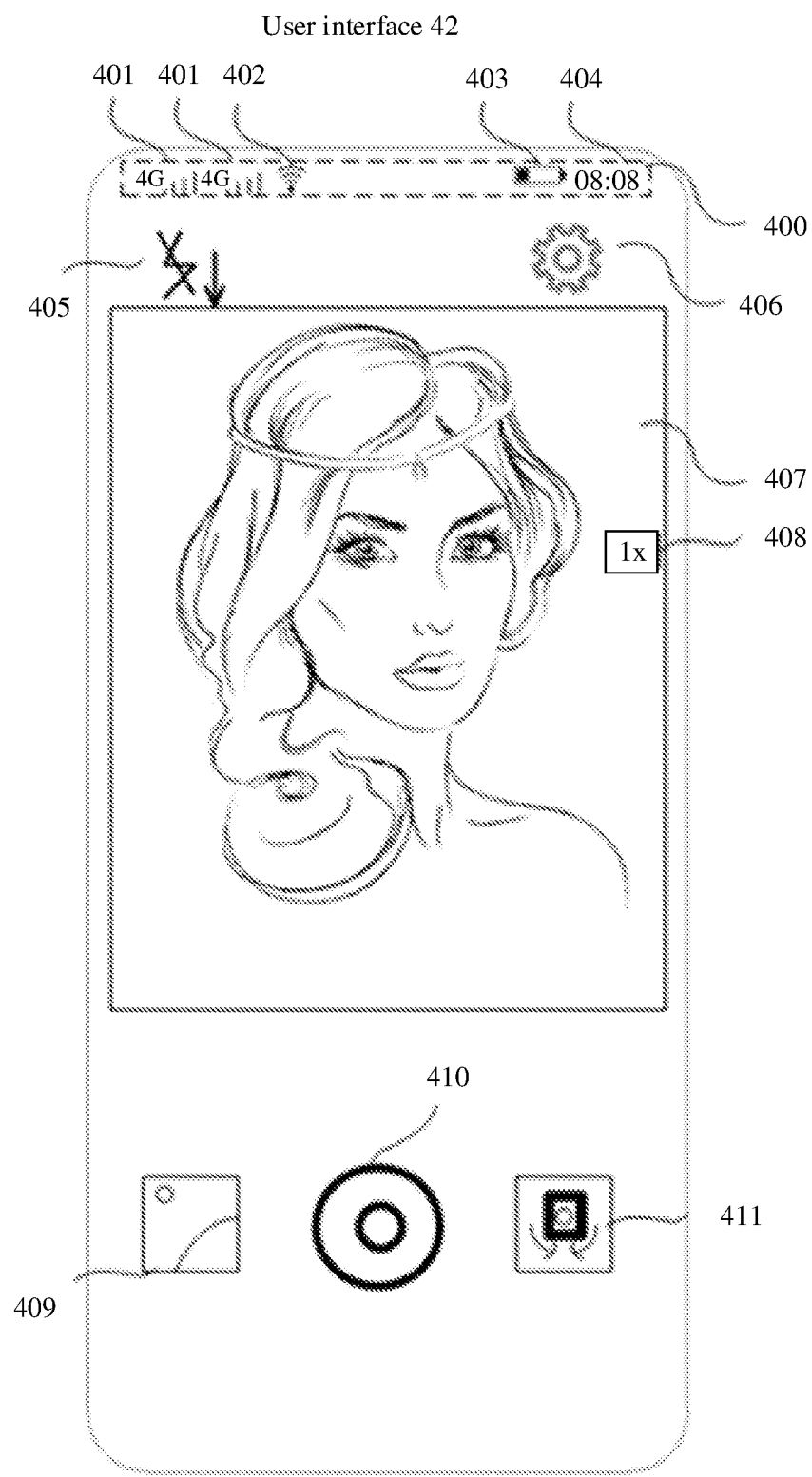

When the version number of the update plug-in released by the server is later than the version number of the locally installed plug-in, the electronic device 100 displays the first user interface. As shown in FIG. 4C, the first user interface may be a user interface 42. The user interface 42 includes a status bar 400 and a first application (for example, the camera application) interface. Display elements of the first application interface include the flash button 405, the camera setting button 406, the viewfinder frame 407, the zoom-in button 408, the picture option 409, the photographing button 410, and the camera switch 411.

As shown in FIG. 4C, different from the user interface 41, the electronic device displays a schematic arrow beside the flash button 405, to prompt the user that a flash plug-in corresponding to the flash button 405 has an updated version. The foregoing schematic arrow may also be replaced with a red dot or the like, and a specific display form is not limited herein.

S402: The electronic device receives a first user operation. The first user operation is used to request to install a first plug-in related to the first application, the first application is an application locally installed in the electronic device, the first application includes a first plug-in framework and at least one plug-in associated with the first plug-in framework, a major version number of each of the at least one plug-in is the same as a major version number of the first plug-in framework, each of the at least one plug-in has a second version number corresponding to the plug-in, the first plug-in framework has a first version number, both the first version number and the second version number include a major version number, a sub version number, and a phase version number, and the first plug-in is different from the at least one plug-in.

Different applications correspond to different plug-in frameworks and different plug-ins. Each plug-in framework has a plug-in associated with the plug-in framework.

Each plug-in has a version number corresponding to the plug-in. Each plug-in framework has a version number corresponding to the plug-in framework.

The first user operation may be any preset operation, and the preset operation may be a touch-and-hold operation, a slide-down operation, or the like. For example, the user touches and holds the flash button 405, or the user slides from top to bottom along the foregoing schematic arrow. The user operation is not specifically limited in this embodiment of this application.

S403: The electronic device receives the first plug-in from the server in response to the first user operation.

For downloading, by the electronic device, the first plug-in from the server, refer to FIG. 3B. Details are not described herein again.

S404: The electronic device detects whether a major version number of the first plug-in is the same as the major version number of the first plug-in framework.

The electronic device obtains the first plug-in, and detects whether the major version number of the first plug-in is the same as the major version number of the first plug-in framework.

The major version number is a first part of the version number. For example, if the version number is 900.801.100, the major version number is 900. If the version number is 9.0.2, the major version number is 9. The major version number of the first plug-in and the major version number of the first plug-in framework are compared, to determine whether the major version number of the first plug-in and the major version number of the first plug-in framework are the same.

S405: If yes, the electronic device installs the first plug-in.

When the major version number of the first plug-in is the same as the major version number of the first plug-in framework, the electronic device installs the first plug-in. That is, as long as a major version number of a plug-in is the same as a major version number of a corresponding plug-in framework, the electronic device allows installation of the plug-in.

Figures 1, 4D:
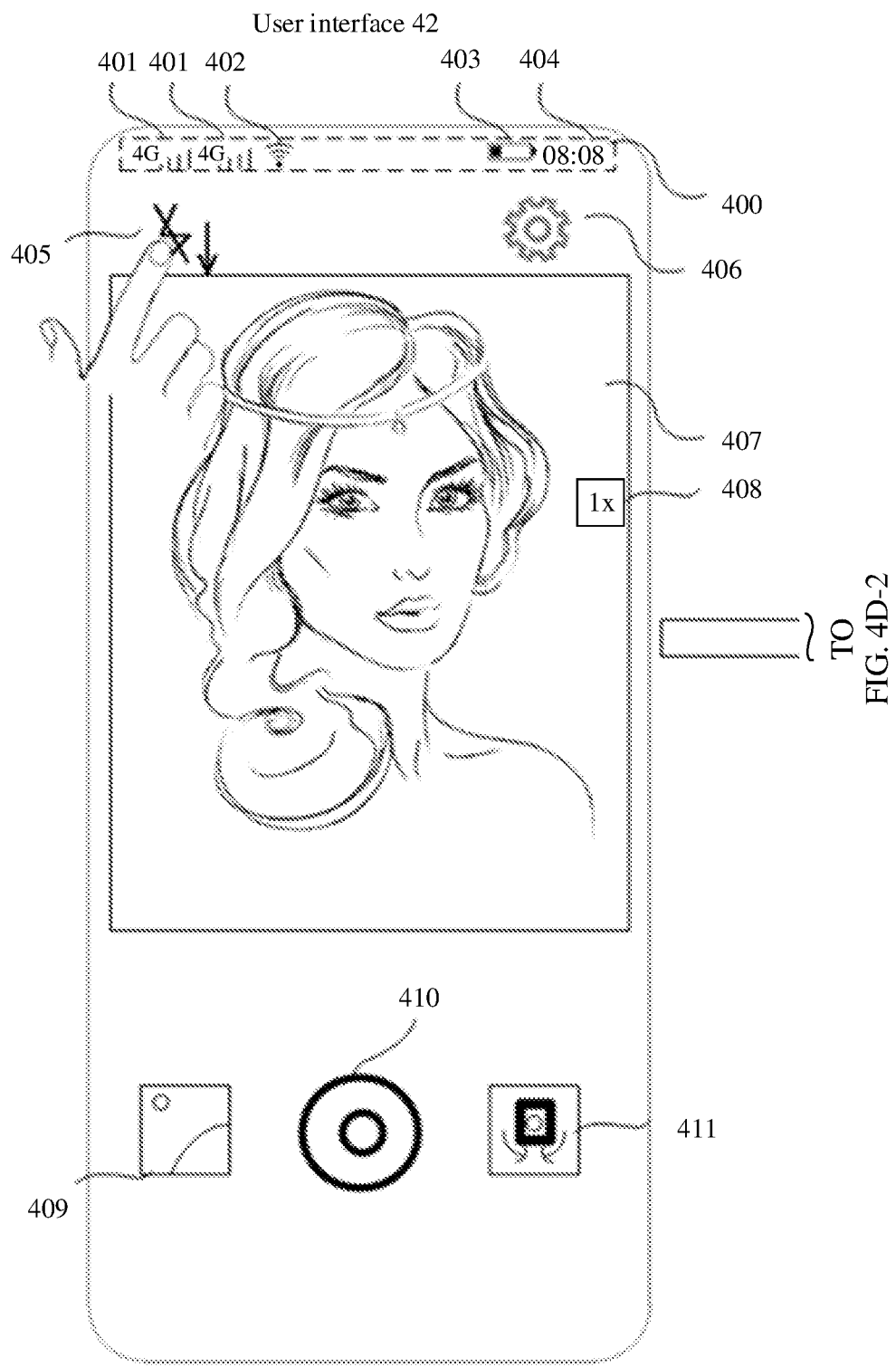
Figures 2, 4D:
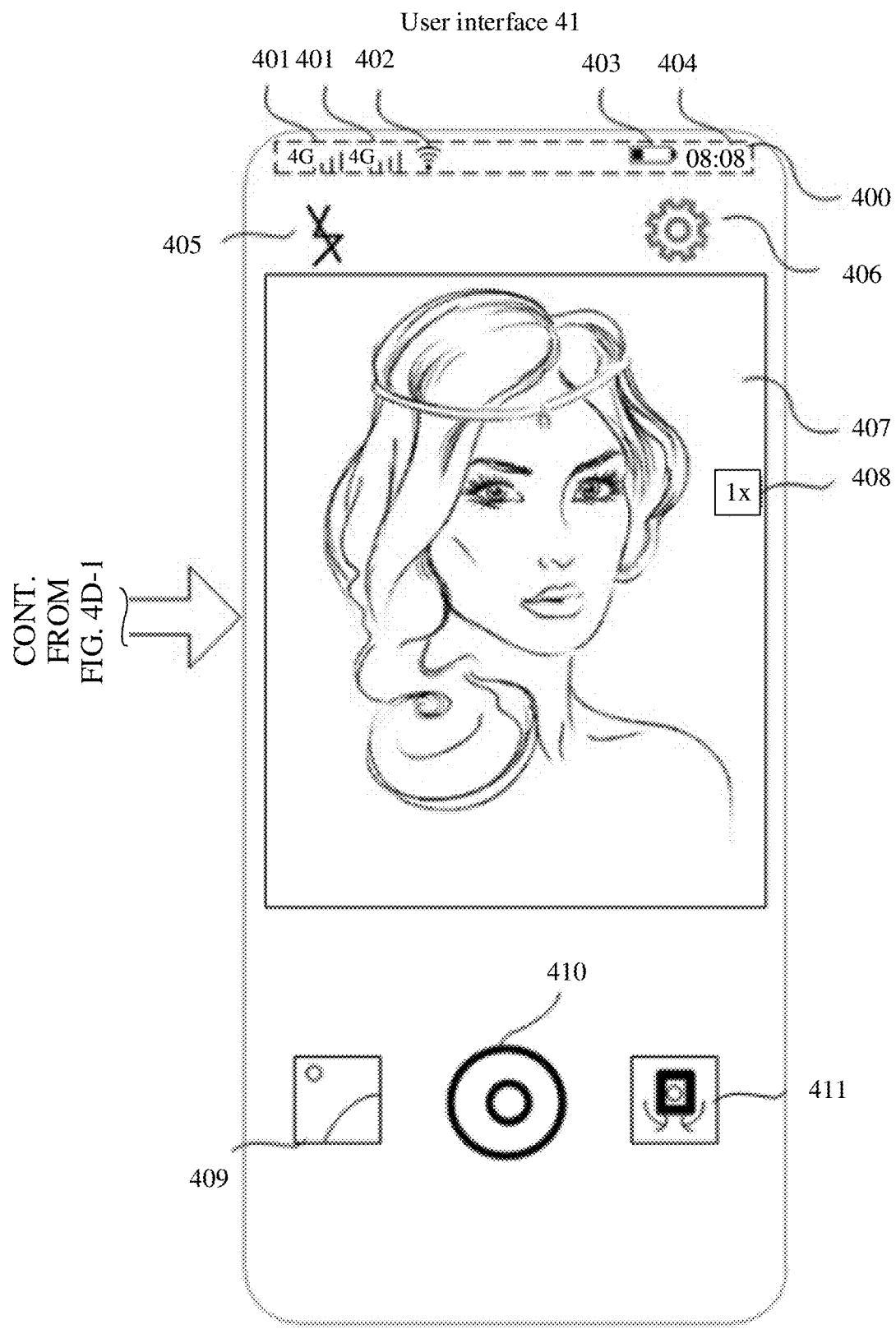

As shown in FIGS. 4D-1 and 4D-2, when the user performs the preset operation on the flash button 405, the electronic device receives, from the server in response to the user operation, an updated version of a plug-in corresponding to the flash button 405. As shown in FIG. 3B, the electronic device may download, from the plug-in server, the updated version of the plug-in corresponding to the flash button 405.

The electronic device detects whether a major version number of the plug-in is the same as the major version number of the plug-in framework of the camera. For example, a version number of the plug-in is 9.0.2, and a version number of the plug-in framework of the camera application is 9.0.1. In this case, the electronic device obtains the major version number 9 of the plug-in and the major version number 9 of the plug-in framework of the camera application, and determines that the major version number of the plug-in is the same as the major version number of the plug-in framework of the camera application. The electronic device installs the plug-in of a new version, and replaces an old version of the plug-in.

When the major version number of the plug-in is different from the major version number of the plug-in framework of the camera application, the electronic device does not install the plug-in of the new version.

After the electronic device detects that installation of the plug-in is completed, the electronic device may switch from the user interface 42 to the user interface 41.

According to this embodiment of this application, when installing a plug-in, the electronic device may install the plug-in after ensuring that a major version number of the plug-in is the same as a major version number of a plug-in framework. Compared with a means in which installation can be performed only when a version number of a plug-in and a version number of a plug-in framework are totally the same in the conventional technology, plug-in installation of the electronic device in this solution is more flexible and has higher compatibility.

In addition, in this solution, the user can download and install different plug-ins based on different requirements, and does not need to install all plug-ins of a corresponding application. This improves user experience.

Figure 5A:
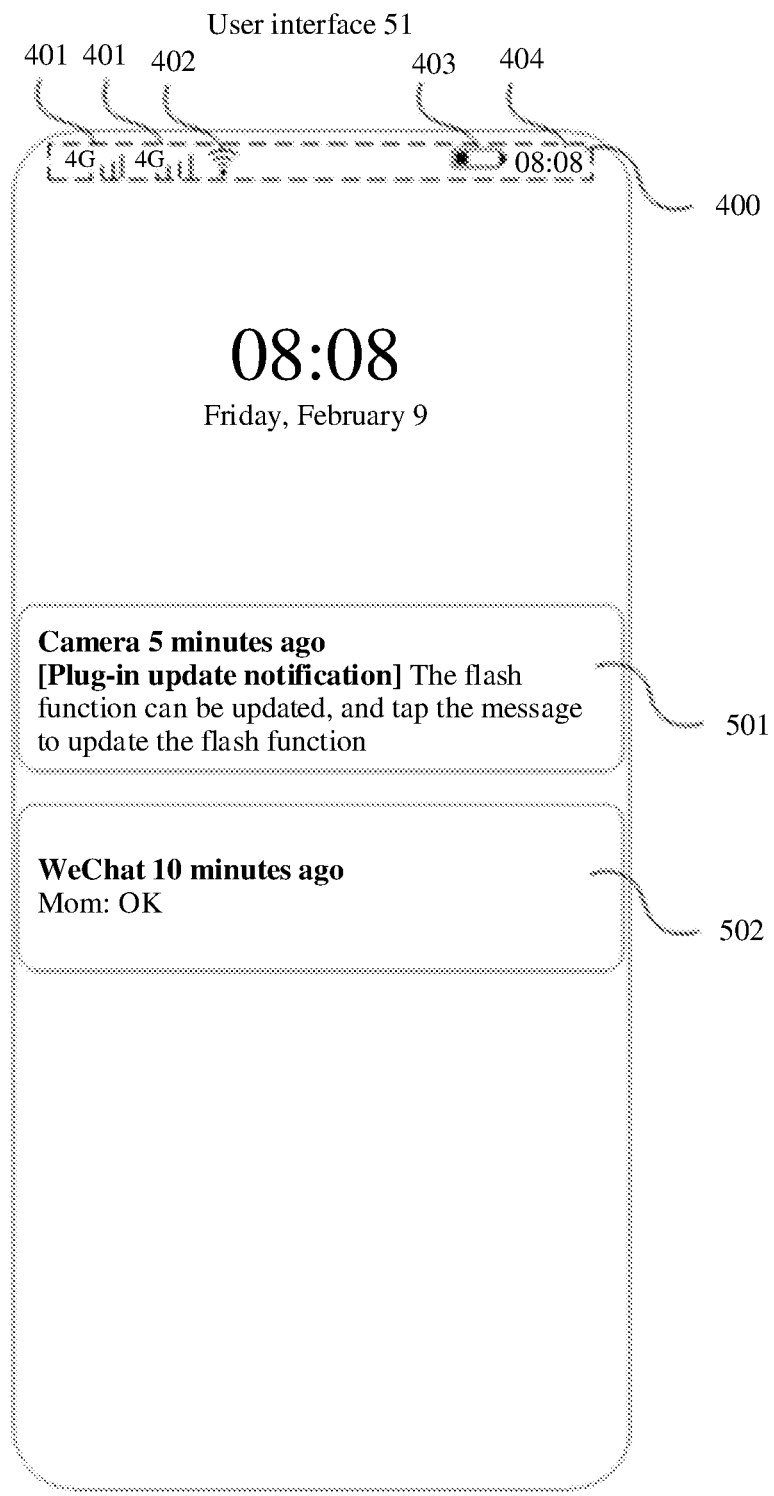
Figures 1, 5B:
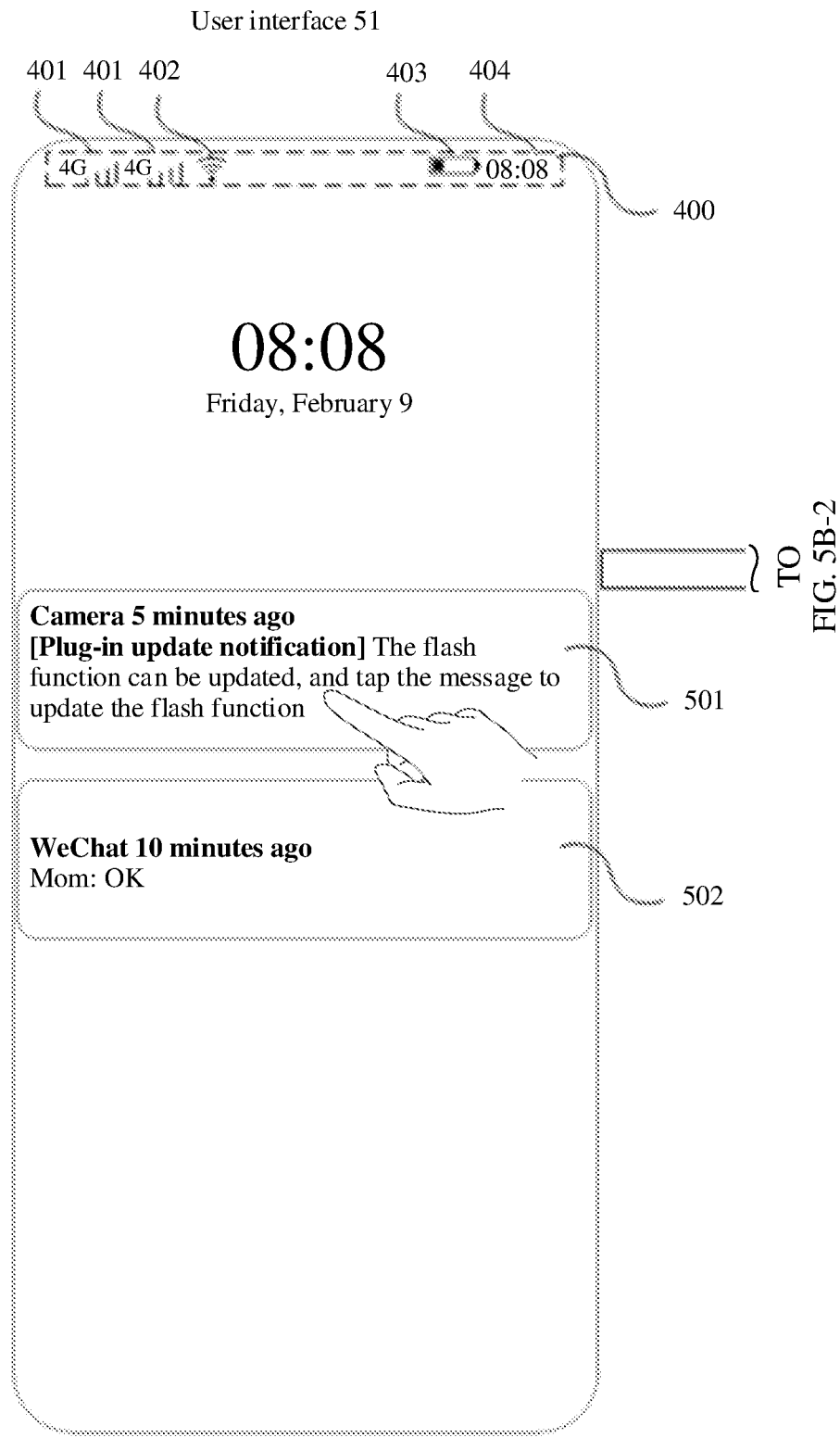
Figures 2, 5B:
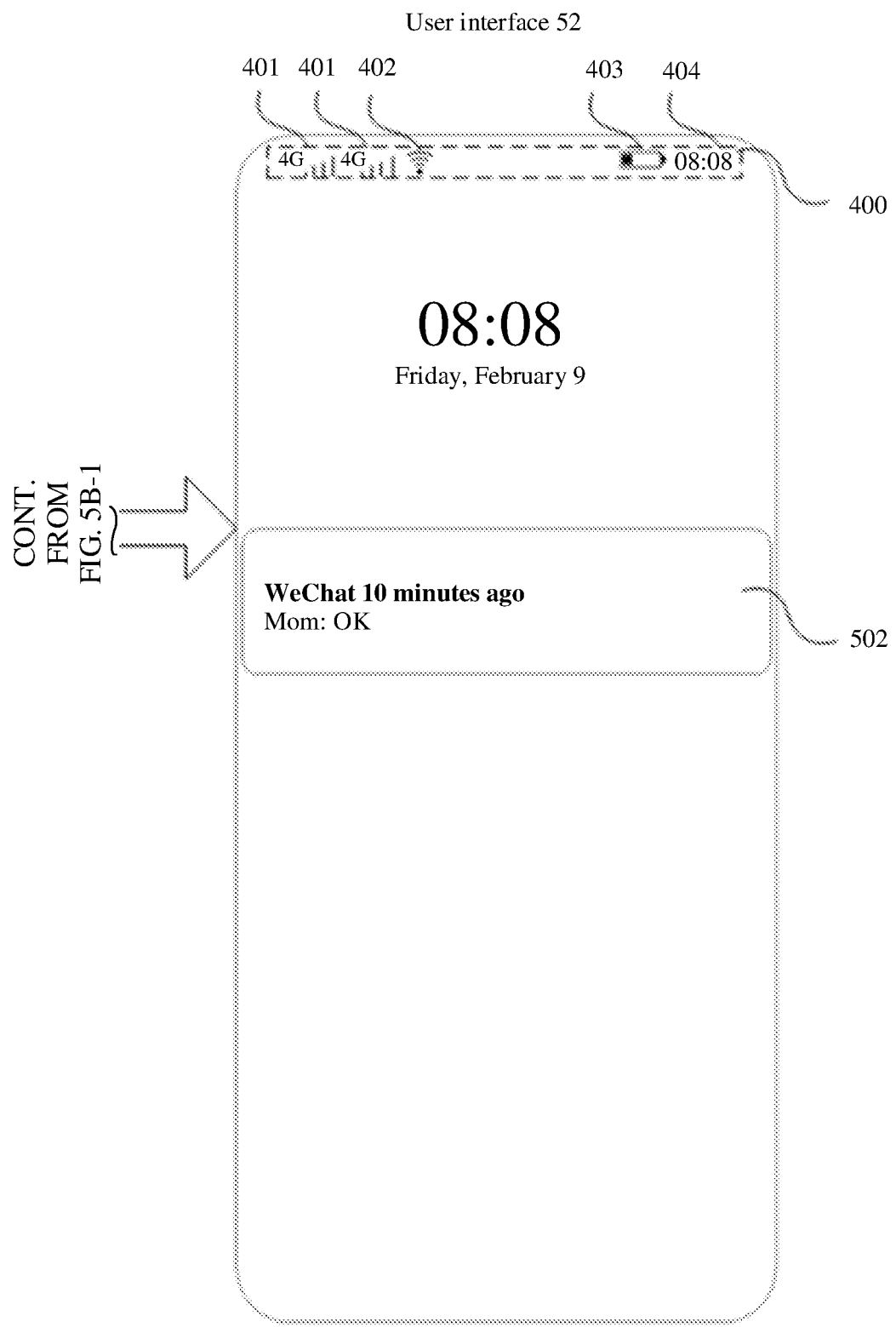

In another optional implementation, FIG. 5A to FIG. 5B-2 are respectively schematic diagrams of other human-machine interaction interfaces according to an embodiment of this application.

Similar to the method in FIG. 4B, an electronic device sends a request to a server at a preset time interval, to obtain whether an update plug-in corresponding to a locally installed application in the electronic device is released in the server.

Specifically, when the server releases an update plug-in of a camera application, the electronic device detects a plug-in that is in plug-ins of a locally installed camera application and whose identifier is the same as an identifier of the update plug-in of the camera application released by the server. Then, the electronic device detects whether a version number of the update plug-in released by the server is later than a version number of the corresponding plug-in installed locally. If the electronic device detects that the identifier of the update plug-in released by the server is the same as an identifier of a locally installed flash plug-in, the electronic device determines that the update plug-in is the flash plug-in. The electronic device detects whether a version number of the flash plug-in released by the server is later than a version number of the locally installed flash plug-in. When the version number of the flash plug-in released by the server is later than the version number of the locally installed flash plug-in, an electronic device 100 displays a first user interface.

As shown in FIG. 5A, the first user interface may be a user interface 51. The user interface 51 includes a status bar 400 and an application home screen. The application home screen includes reminder information 501 and reminder information 502. The reminder information 501 is a plug-in update notification of the camera application. The camera is a locally installed application of the electronic device. The plug-in update notification is used to notify a user that a plug-in corresponding to a flash function is updated.

As shown in FIG. 5B-i and FIG. 5B-2, when the user taps the reminder information 501, the electronic device receives, from the server in response to the user operation, the plug-in of a new version corresponding to the flash button 405. The electronic device detects whether a major version number of the plug-in is the same as a major version number of a plug-in framework of the camera. When the major version number of the plug-in is the same as the major version number of the plug-in framework of the camera, the electronic device installs the plug-in of the new version.

After the electronic device detects that installation of the update plug-in is completed, the electronic device switches from the user interface 51 to a user interface 52.

If the major version number of the plug-in is different from the major version number of the plug-in framework of the camera, the electronic device does not install the plug-in of the new version.

According to this embodiment of this application, when installing a plug-in, the electronic device may install the plug-in after ensuring that a major version number of the plug-in is the same as a major version number of a plug-in framework. Compared with a means in which installation can be performed only when a version number of a plug-in and a version number of a plug-in framework are totally the same in the conventional technology, plug-in installation of the electronic device in this solution is more flexible and has higher compatibility.

In addition, in this solution, the user can download and install different plug-ins based on different requirements, and does not need to install all plug-ins of a corresponding application. This improves user experience.

The human-machine interaction interfaces shown in FIG. 4B to FIGS. 4D-2 and 5A to FIG. 5B-2 are all schematic interaction diagrams of plug-ins included in an application locally installed in the electronic device. When an identifier corresponding to a plug-in released by the server is different from an identifier of a plug-in included in a corresponding application installed locally, that is, the server releases a new plug-in, the foregoing method is still applicable. Before step S401, the method may include:

The electronic device obtains application update information from the server at a preset time interval.

When the server releases the new plug-in, the electronic device obtains the application update information from the server such as an app marketplace at the preset time interval.

The electronic device notifies, by using a pop-up window, an interface display, or the like, the user that update information of the corresponding application exists, so as to indicate the user to perform an upgrade.

When detecting that the user performs an application update operation, the electronic device updates the application in response to the user operation.

After the update is completed, a function icon corresponding to the new plug-in may be displayed on an interface of the corresponding application, and a schematic arrow or the like may be displayed beside the function icon, to indicate to the user that the plug-in of the function can be downloaded.

In an optional implementation, when a plug-in that has been released but has not been downloaded exists on the interface of the application installed by the user, the electronic device displays, on the interface of the application, a function icon corresponding to the plug-in, and displays a schematic arrow and the like beside the function icon, to indicate that the plug-in can be downloaded.

In another optional implementation, the method may further include:

The electronic device may send the request to the server at the preset time interval, to obtain whether the update plug-in corresponding to the locally installed application in the electronic device is released in the server.

If the update plug-in exists, the electronic device detects whether an identifier of the update plug-in is the same as an identifier of each plug-in of the locally installed application.

If there is no plug-in whose identifier is the same as the identifier of the update plug-in, the electronic device triggers to perform step S401.

When there is no plug-in whose identifier is the same as the identifier of the update plug-in, the electronic device determines that the update plug-in is the new plug-in of the corresponding application. The electronic device may display preset information on a preset interface of the corresponding application, to indicate a plug-in having a new function, and may indicate the user to download the plug-in.

Specifically, the electronic device sends the request to the server at the preset time interval, to obtain whether the update plug-in corresponding to the locally installed application in the electronic device is released in the server. When an update plug-in of the camera application is released, the electronic device detects whether an identifier of the update plug-in of the camera application released by the server is the same as an identifier of each plug-in of the locally installed camera application. If the identifier of the update plug-in of the camera application released by the server is not the same as the identifier of each plug-in of the locally installed camera application, the electronic device determines that the update plug-in is a new plug-in corresponding to the camera application. The electronic device displays update information of the update plug-in in a corresponding application or prompts the user in a pop-up window.

For example, when the update plug-in of the camera application is released, the electronic device detects whether the locally installed camera application includes the plug-in, and if the locally installed application does not include the plug-in, the electronic device wo displays the first user interface. For the first user interface, refer to the user interface shown in FIG. 4C or the user interface shown in FIG. 5A. This is not specifically limited herein.

Specifically, if the camera application currently does not include a plug-in corresponding to a function, when the server releases a plug-in A corresponding to the new function, the electronic device may directly display the new function icon on an application interface of the camera application, and display a schematic arrow beside the new function icon, as shown in FIG. 4C, to prompt the user to download and install the new plug-in. Optionally, the electronic device may alternatively display the update information in a pop-up window. Refer to FIG. 5A. The electronic device receives the plug-in from the server by receiving a first user operation and responding to the first user operation, and detects whether a major version number of the plug-in is the same as a major version number of a plug-in framework associated with the plug-in; and if yes, the electronic device installs the plug-in.

The camera application is merely used as an example in the foregoing embodiment, and a specific application type is not limited in this solution.

Figure 6:
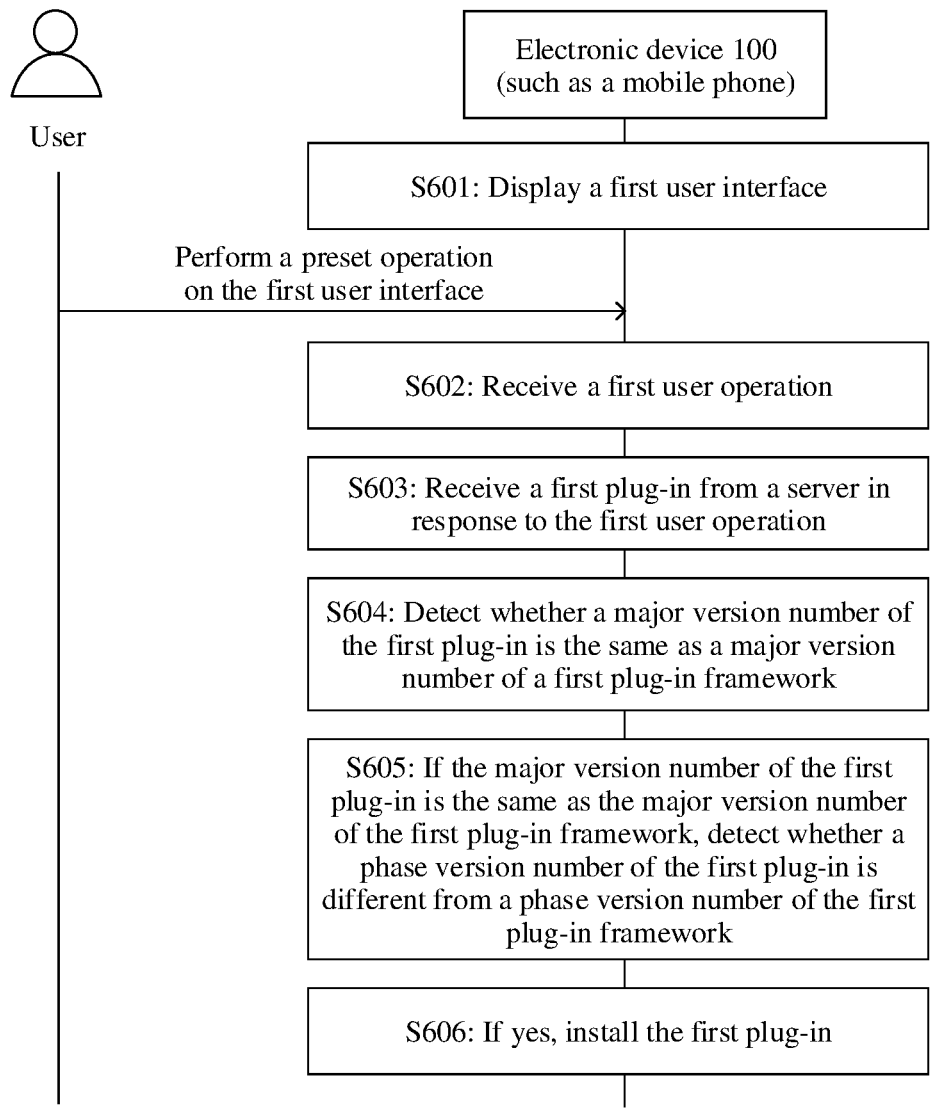
FIG. 6 is a schematic flowchart of another plug-in installation method according to an embodiment of this application.

In another implementation of this embodiment of this application, FIG. 6 is a schematic flowchart of a plug-in installation method according to an embodiment of this application. As shown in FIG. 6, the method includes steps S601 to S606, which are specifically as follows:

S601: An electronic device displays a first user interface.

The first user interface may be the user interface shown in FIG. 4C or the user interface shown in FIG. 5A. This is not specifically limited herein.

S602: The electronic device receives a first user operation. The first user operation is used to request to install a first plug-in related to the first application, the first application is an application locally installed in the electronic device, the first application includes a first plug-in framework and at least one plug-in associated with the first plug-in framework, a major version number of each of the at least one plug-in is the same as a major version number of the first plug-in framework, each of the at least one plug-in has a second version number corresponding to the plug-in, the first plug-in framework has a first version number, both the first version number and the second version number include a major version number, a sub version number, and a phase version number, and the first plug-in is different from the at least one plug-in.

S603: The electronic device receives the first plug-in from a server in response to the first user operation.

S604: The electronic device detects whether a major version number of the first plug-in is the same as the major version number of the first plug-in framework.

S605: If the major version number of the first plug-in is the same as the major version number of the first plug-in framework, the electronic device detects whether a phase version number of the first plug-in is different from a phase version number of the first plug-in framework.

S606: If the phase version number of the first plug-in is different from the phase version number of the first plug-in framework, the electronic device installs the first plug-in.

When a major version number of a plug-in is the same as a major version number of a plug-in framework of a camera, the electronic device determines whether a phase version number of the plug-in is different from a phase version number of the plug-in framework. When the phase version number of the plug-in is different from the phase version number of the plug-in framework, the electronic device installs the plug-in.

A sub version number of the plug-in may be the same as or different from a sub version number of the plug-in framework. This is not limited herein.

According to this embodiment of this application, when installing a plug-in, the electronic device may install the plug-in after ensuring that a major version number of the plug-in is the same as a major version number of a plug-in framework, and a phase version number of the plug-in is different from a phase version number of the plug-in framework. Compared with a means in which installation can be performed only when a version number of a plug-in and a version number of a plug-in framework are totally the same in the conventional technology, plug-in installation of the electronic device in this solution is more flexible and has higher compatibility.

Figure 7:
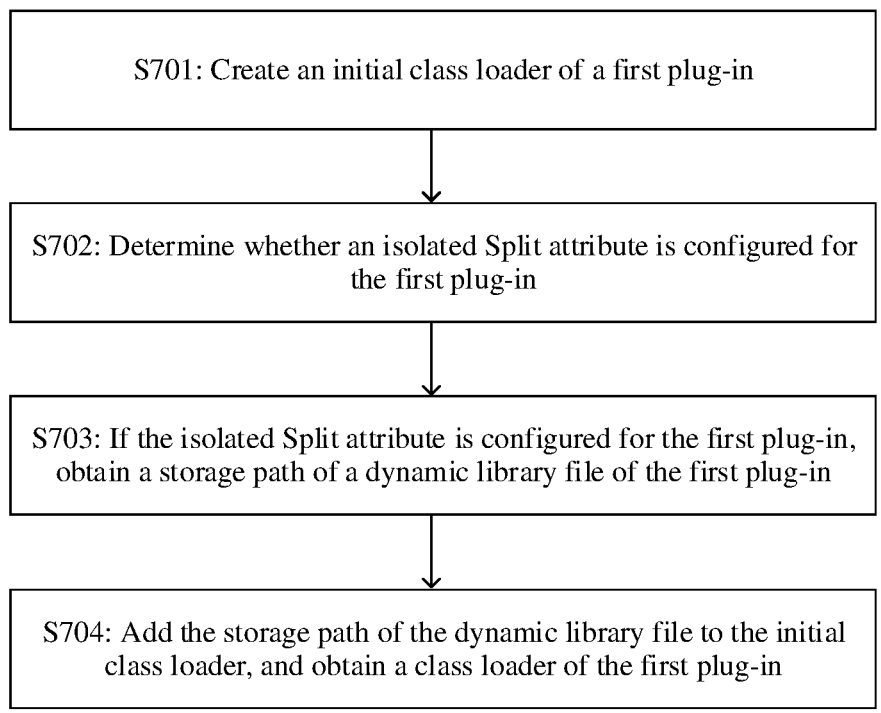
FIG. 7 is a schematic flowchart in which a class loader is created according to an embodiment of this application.

FIG. 7 is a schematic flowchart of a method for creating a class loader according to an embodiment of this application.

A dynamic library is also referred to as a shared library. The dynamic library marks invoked code in an executable program, and required functions are loaded only when the program runs. In other words, the executable program needs to be supported by the dynamic library during running and cannot be executed independently. In this way, if code of a module is modified, the entire program does not need to be recompiled. Instead, only a part of the program needs to be compiled to generate a new dynamic library. so file.

In the conventional technology, for a plug-in configured with an isolated Split attribute, a dynamic library file inside the plug-in cannot be accessed currently. Therefore, according to the plug-in installation method provided in this solution, for an isolated plug-in, the plug-in can access a dynamic library file inside the plug-in. When a class loader is created, a dynamic library file scanned in an application is added to the class loader, so that a class can be loaded. As shown in FIG. 7, the method may include steps S701 to S704, which are specifically as follows:

S701: An electronic device creates an initial class loader of a first plug-in.

S702: The electronic device determines whether an isolated Split attribute is configured for the first plug-in.

S703: If the isolated Split attribute is configured for the first plug-in, the electronic device obtains a storage path of a dynamic library file of the first plug-in.

S704: The electronic device adds the storage path of the dynamic library file to the initial class loader, and obtains a class loader of the first plug-in.

When detecting that the isolated Split attribute is configured for a plug-in, the electronic device obtains a storage path of a dynamic library file of the plug-in, and adds the storage path of the dynamic library file to the class loader, to support the plug-in in accessing a dynamic library file inside the plug-in.

Figure 8:
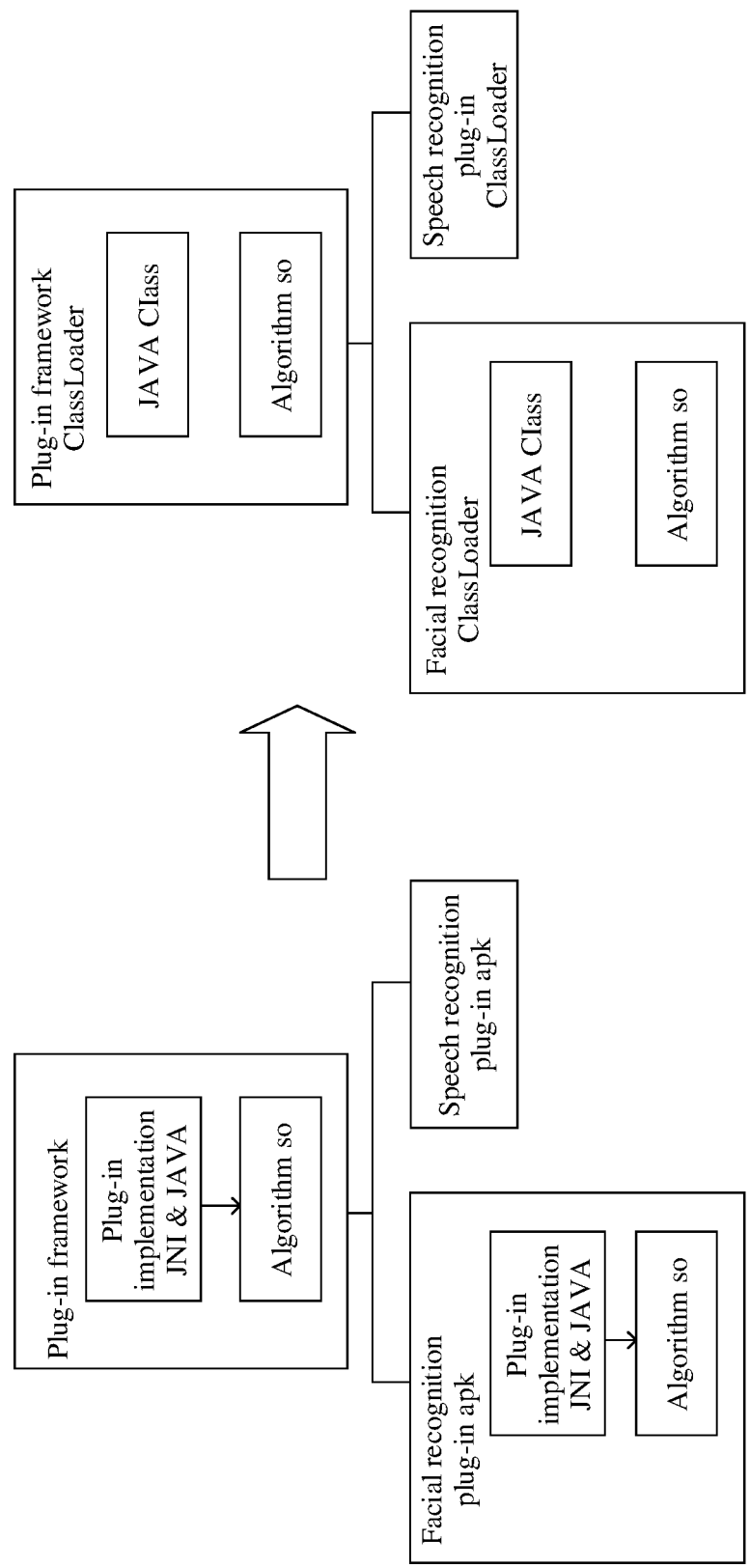
FIG. 8 is a schematic diagram of creating a class loader according to an embodiment of this application.

FIG. 8 is a schematic diagram in which a facial recognition plug-in creates a class loader according to an embodiment of this application. After determining that an isolated Split attribute is configured for the facial recognition plug-in, the electronic device obtains a storage path of a dynamic library file of the facial recognition plug-in, and adds the storage path of the dynamic library file to a class loader of the facial recognition plug-in. In this way, the facial recognition plug-in can access a dynamic library file inside the facial recognition plug-in.

Figure 9:
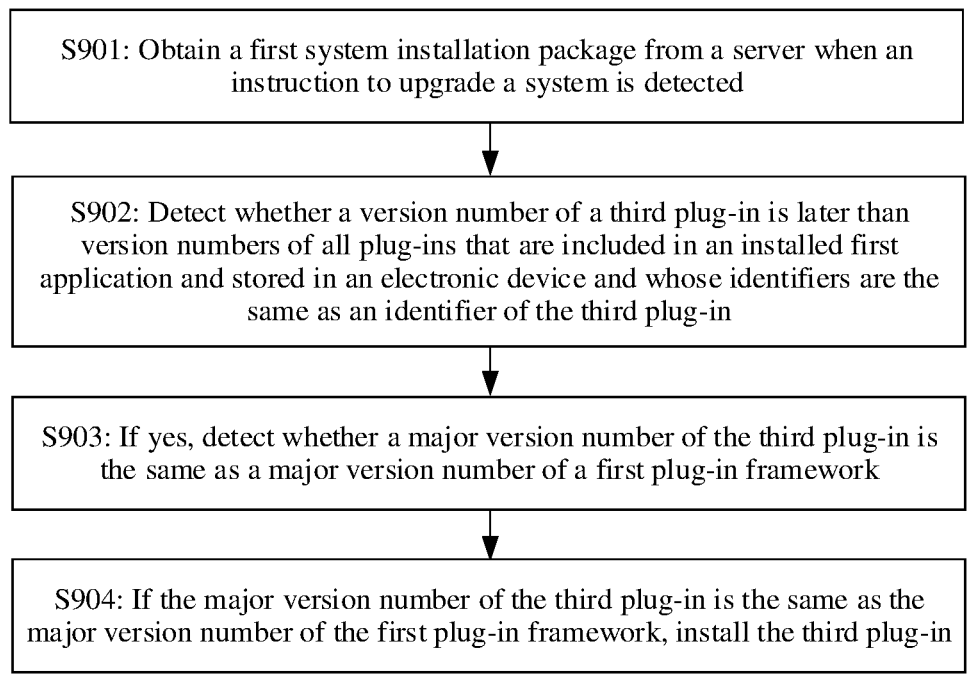
FIG. 9 is a schematic flowchart of a system upgrade method according to an embodiment of this application.

FIG. 9 is a schematic flowchart of a system upgrade method according to an embodiment of this application.

When a system of an electronic device performs OTA upgrade, when a preset partition and an installation partition each have a same plug-in, a plug-in of a lower version may be selected in the OTA upgrade process. For example, only a plug-in and a plug-in framework in the preset partition are selected for installation during system upgrade, and a version number of the plug-in in the preset partition may be lower than a version number of the plug-in in the installation partition, or a version number of a plug-in framework in the preset partition may be lower than a version number of a plug-in framework in the installation partition. Consequently, after the OTA upgrade, the version of the plug-in or the plug-in framework is downgraded. Therefore, this solution provides a control method for performing system upgrade on the electronic device. When it is detected that the electronic device performs the OTA upgrade, the electronic device obtains two directories of the preset partition and the installation partition that correspond to to-be-upgraded application, and detects version numbers of plug-ins and plug-in frameworks in the two directories, to obtain a latest version of each plug-in and a latest version of each plug-in framework. According to the latest version of each plug-in and the latest version of each plug-in framework, a new installation application is formed and installed. In addition, the electronic device deletes or disables the previously installed application, to complete the OTA upgrade.

Refer to FIG. 9. A first application is an application locally installed in the electronic device, the first application includes a first plug-in framework and at least one plug-in associated with the first plug-in framework, and a major version number of each plug-in in the at least one plug-in is the same as a major version number of the first plug-in framework. The method includes steps S901 to S904, which are specifically as follows:

S901: When the electronic device detects an instruction to upgrade a system, the electronic device obtains a first system installation package from a server. The first system installation package includes an installation package of at least one application, the at least one application includes the first application, the first application includes the first plug-in framework and the at least one plug-in associated with the first plug-in framework, the major version number of each of the at least one plug-in is the same as the major version number of the first plug-in framework, each of the at least one plug-in has a second version number corresponding to the plug-in, the first plug-in framework has a first version number, both the first version number and the second version number include a major version number, a sub version number, and a phase version number, an installation package of the first application includes a third plug-in, the at least one plug-in that is included in the installed first application and stored in the electronic device includes a fourth plug-in and a fifth plug-in, the third plug-in, the fourth plug-in, and the fifth plug-in are plug-ins with different version numbers but a same identifier, the fourth plug-in is stored in a preset partition of the electronic device, the fifth plug-in is stored in an installation partition of the electronic device, each plug-in carries an identifier, and plug-ins corresponding to a same function icon have a same identifier.

S902: The electronic device detects whether a version number of the third plug-in is later than version numbers of all plug-ins that are included in the installed first application and stored in the electronic device and whose identifiers are the same as an identifier of the third plug-in.

S903: If yes, the electronic device detects whether a major version number of the third plug-in is the same as the major version number of the first plug-in framework.

S904: If the major version number of the third plug-in is the same as the major version number of the first plug-in framework, the electronic device installs the third plug-in, and deletes/disables all plug-ins whose identifiers are the same as the identifier of the third plug-in.

If the fourth plug-in is a plug-in with a latest version number among all plug-ins whose identifiers are the same as the identifier of the third plug-in, the electronic device installs the fourth plug-in, and disables other plug-ins, except the fourth plug-in, whose identifiers are the same as the identifier of the third plug-in.

Further, the installation package of the first application further includes a second plug-in framework, the first plug-in framework and the second plug-in framework are plug-in frameworks of different version numbers, and the method further includes:

The electronic device detects whether a version number of the second plug-in framework is later than a version number of the first plug-in framework.

If yes, the electronic device installs the second plug-in framework, and deletes/disables the first plug-in framework.

If the version number of the second plug-in framework is lower than the version number of the first plug-in framework, the electronic device installs the first plug-in framework and disables the second plug-in framework.

Optionally, if versions of a plug-in framework and plug-ins in a partition such as an installation partition corresponding to an application are the latest versions, the version of the partition is directly used, and versions of a plug-in framework and plug-ins in a preset partition are deleted or disabled.

Optionally, that the electronic device installs the third plug-in includes: The electronic device installs a class loader of the third plug-in. That the electronic device installs a class loader of the third plug-in includes:

The electronic device creates an initial class loader of the third plug-in.

The electronic device determines whether an isolated Split attribute is configured for the third plug-in.

If the isolated Split attribute is configured for the third plug-in, the electronic device obtains a storage path of a dynamic library file of the third plug-in.

The electronic device adds the storage path of the dynamic library file to the initial class loader, and obtains the class loader of the third plug-in.

Optionally, the third plug-in is an artificial intelligence AI plug-in.

Optionally, the artificial intelligence AI plug-in includes one or more of the following a facial recognition plug-in, an image super-resolution plug-in, an intent recognition plug-in, a text translation plug-in, a speech recognition plug-in, a head unit voice wakeup plug-in, and a head unit speech recognition plug-in.

This solution may be applied to an artificial intelligence (Artificial Intelligence, AI) terminal, and may be applied to an artificial intelligence plug-in.

Figure 10:
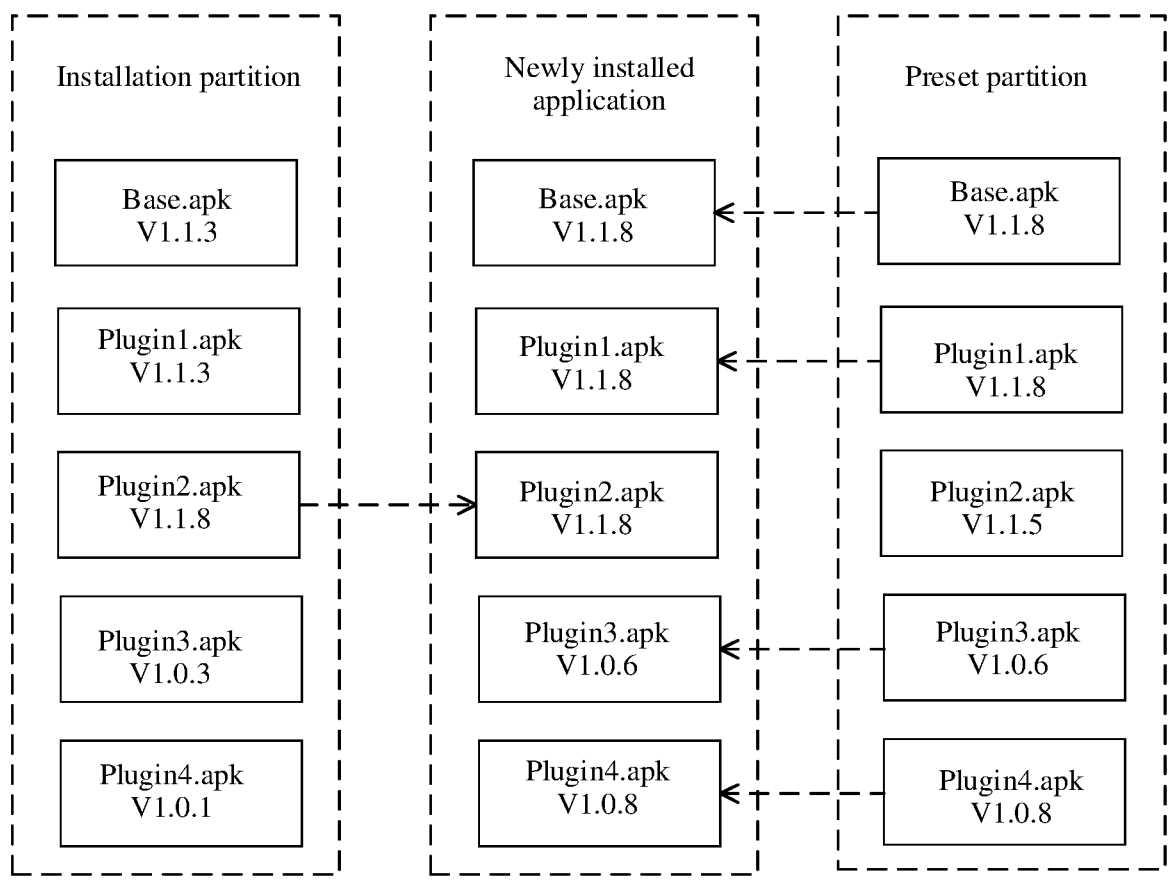
FIG. 10 is a schematic diagram in which an electronic device performs OTA upgrade according to an embodiment of this application.

FIG. 10 is a schematic diagram of an embodiment in which an electronic device performs OTA upgrade. The electronic device separately obtains an installation partition and a preset partition of a corresponding application. Both the installation partition and the preset partition include a plug-in framework and plug-ins corresponding to the foregoing application. The electronic device learns that a version number of a plug-in framework in the installation partition is 1.1.3, and a version number of a plug-in framework in the preset partition is 1.1.8. The electronic device determines that the version number of the plug-in framework in the preset partition is later than the version number of the plug-in framework in the installation partition, and the electronic device uses the plug-in framework in the preset partition as a plug-in framework of a newly installed application.

Further, the electronic device learns that a version number of a plug-in 1 in the installation partition is 1.1.3, and a version number of a plug-in 1 in the preset partition is 1.1.8. The electronic device determines that the version number of the plug-in 1 in the preset partition is later than the version number of the plug-in 1 in the installation partition, and the electronic device uses the plug-in 1 in the preset partition as a plug-in 1 of the newly installed application. Sequentially, the electronic device learns that a version number of a plug-in 2 in the installation partition is 1.1.8, and a version number of a plug-in 2 in the preset partition is 1.1.5. The electronic device determines that the version number of the plug-in 2 in the installation partition is later than the version number of the plug-in 2 in the preset partition, and the electronic device uses the plug-in 2 in the installation partition as a plug-in 2 of the newly installed application. Similarly, the electronic device determines that version numbers of a plug-in 3 and a plug-in 4 in the preset partition are respectively later than version numbers of a plug-in 3 and a plug-in 4 in the installation partition, and the electronic device uses the plug-in 3 and the plug-in 4 in the preset partition as a plug-in 3 and a plug-in 4 of the newly installed application.

The electronic device sequentially traverses different plug-ins and plug-in frameworks in the partitions, and obtains a plug-in and a plug-in framework of a latest version, to obtain an installation package of the newly installed application, so as to perform installation and complete the OTA upgrade.

The OTA upgrade may include installation packages of a plurality of applications. A method for obtaining the installation packages of the applications is the same as the foregoing method. Details are not described herein again.

According to this embodiment of this application, after completing the OTA upgrade, the electronic device can correspondingly upgrade versions of plug-ins and plug-in frameworks of an application to the latest version, so as to resolve a weakness in the conventional technology that the version is downgraded after the OTA upgrade.

An embodiment of this application further provides an apparatus, including one or more processors and one or more memories. The one or more memories are coupled to the one or more processors, the one or more memories are configured to store computer program code, the computer program code includes computer instructions, and when the one or more processors execute the computer instructions, the apparatus is enabled to perform the following operations:

When the one or more processors execute the computer instructions, the apparatus is enabled to perform the following operations:
receiving a first user operation, where the first user operation is used to request to install a first plug-in related to a first application, the first application is an application locally installed in the apparatus, the first application includes a first plug-in framework and at least one plug-in associated with the first plug-in framework, a major version number of each of the at least one plug-in is the same as a major version number of the first plug-in framework, each of the at least one plug-in has a second version number corresponding to the plug-in, the first plug-in framework has a first version number, both the first version number and the second version number include a major version number, a sub version number, and a phase version number, and the first plug-in is different from the at least one plug-in;
receiving the first plug-in from a server in response to the first user operation;
detecting whether a major version number of the first plug-in is the same as the major version number of the first plug-in framework; and
if yes, installing the first plug-in.

Optionally, a phase version number of the first plug-in is different from a phase version number of the first plug-in framework.

The apparatus further performs the following operation: The at least one plug-in includes a second plug-in, and the first plug-in is an update plug-in corresponding to the second plug-in.

The apparatus further performs the following operation: The first plug-in is a new plug-in of the first application.

The apparatus further performs the following operations:
creating an initial class loader of the first plug-in;
determining whether an isolated Split attribute is configured for the first plug-in;
if the isolated Split attribute is configured for the first plug-in, obtaining a storage path of a dynamic library file of the first plug-in; and
adding the storage path of the dynamic library file to the initial class loader, and obtaining a class loader of the first plug-in.

The apparatus further performs the following operation: when detecting an instruction to upgrade a system, obtaining a first system installation package from the server, where the first system installation package includes an installation package of at least one application, the at least one application includes the first application, an installation package of the first application includes a third plug-in, the at least one plug-in that is included in the installed first application and stored in the apparatus includes a fourth plug-in and a fifth plug-in, the third plug-in, the fourth plug-in, and the fifth plug-in are plug-ins with different version numbers but a same identifier, the fourth plug-in is stored in a preset partition of the apparatus, the fifth plug-in is stored in an installation partition of the apparatus, each plug-in carries an identifier, and plug-ins corresponding to a same function icon have a same identifier;
detecting whether a version number of the third plug-in is later than version numbers of all plug-ins that are included in the installed first application and stored in the apparatus and whose identifiers are the same as an identifier of the third plug-in;

if yes, detecting whether a major version number of the third plug-in is the same as the major version number of the first plug-in framework; and if the major version number of the third plug-in is the same as the major version number of the first plug-in framework, installing the third plug-in.

The installation package of the first application further includes a second plug-in framework, the first plug-in framework and the second plug-in framework are plug-in frameworks of different version numbers, and the apparatus further performs the following operations:

detecting whether a version number of the second plug-in framework is later than a version number of the first plug-in framework; and if yes, installing the second plug-in framework.

The first plug-in is an artificial intelligence AI plug-in.

The artificial intelligence AI plug-in includes one or more of the following: a facial recognition plug-in, an image super-resolution plug-in, an intent recognition plug-in, a text translation plug-in, a speech recognition plug-in, a head unit voice wakeup plug-in, and a head unit speech recognition plug-in.

The apparatus is a terminal device or a part of a terminal device.

An embodiment of this application further provides an apparatus, including one or more processors and one or more memories. The one or more memories are coupled to the one or more processors, the one or more memories are configured to store computer program code, and the computer program code includes computer instructions.

When the one or more processors execute the computer instructions, the apparatus is enabled to perform the following operations:

when detecting an instruction to upgrade a system, obtaining a first system installation package from a server, where the first system installation package includes an installation package of at least one application, the at least one application includes a first application, the first application includes a first plug-in framework and at least one plug-in associated with the first plug-in framework, a major version number of each of the at least one plug-in is the same as a major version number of the first plug-in framework, each of the at least one plug-in has a second version number corresponding to the plug-in, the first plug-in framework has a first version number, both the first version number and the second version number include a major version number, a sub version number, and a phase version number, an installation package of the first application includes a third plug-in, the at least one plug-in that is included in the installed first application and stored in the apparatus includes a fourth plug-in and a fifth plug-in, the third plug-in, the fourth plug-in, and the fifth plug-in are plug-ins with different version numbers but a same identifier, the fourth plug-in is stored in a preset partition of the apparatus, the fifth plug-in is stored in an installation partition of the apparatus, each plug-in carries an identifier, and plug-ins corresponding to a same function icon have a same identifier;

detecting whether a version number of the third plug-in is later than version numbers of all plug-ins that are included in the installed first application and stored in the apparatus and whose identifiers are the same as an identifier of the third plug-in;

if yes, detecting whether a major version number of the third plug-in is the same as the major version number of the first plug-in framework; and if the major version number of the third plug-in is the same as the major version number of the first plug-in framework, installing the third plug-in.

Optionally, the installation package of the first application further includes a second plug-in framework, the first plug-in framework and the second plug-in framework are plug-in frameworks of different version numbers, and the apparatus further performs the following operations:

detecting whether a version number of the second plug-in framework is later than a version number of the first plug-in framework; and if yes, installing the second plug-in framework.

Optionally, the third plug-in is an artificial intelligence AI plug-in.

The apparatus further performs the following operations:

creating an initial class loader of the third plug-in;

determining whether an isolated Split attribute is configured for the third plug-in;

if the isolated Split attribute is configured for the third plug-in, obtaining a storage path of a dynamic library file of the third plug-in; and adding the storage path of the dynamic library file to the initial class loader, and obtaining a class loader of the third plug-in.

The apparatus is a terminal device or a part of a terminal device.

An embodiment of this application further provides a computer-readable storage medium. The computer-readable storage medium stores instructions. When the instructions are run on a computer or a processor, the computer or the processor is enabled to perform one or more steps in any one of the foregoing methods.

An embodiment of this application further provides a computer program product including instructions. When the computer program product is run on a computer or a processor, the computer or the processor is enabled to perform one or more steps in any one of the foregoing methods.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or the functions according to the embodiments of this application are generated. The computer may be a general-purpose computer, a dedicated computer, a computer network, or another programmable apparatus. The computer instructions may be stored in a computer-readable storage medium, or may be transmitted through the computer-readable storage medium. The computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

A person of ordinary skill in the art may understand that all or some of the procedures of the methods in the embodiments may be implemented by a computer program instructing related hardware. The program may be stored in a computer-readable storage medium. When the program is executed, the procedures of the methods in the embodiments may be performed. The foregoing storage medium includes any medium that can store program code, such as a ROM, a random access memory RAM, a magnetic disk, or an optical disc.

The foregoing descriptions are merely specific implementations of the embodiments of this application, but are not intended to limit the protection scope of the embodiments of this application. Any variation or replacement within the technical scope disclosed in the embodiments of this application shall fall within the protection scope of the embodiments of this application. Therefore, the protection scope of the embodiments of this application shall be subject to the protection scope of the claims.

What is claimed is:

1. A method, comprising:
    receiving, by an electronic device, a first user operation, wherein the first user operation requests to install a first plug-in related to a first application, the first application is locally installed in the electronic device, the first application comprises a first plug-in framework and at least one plug-in associated with the first plug-in framework, a major version number of each plug-in of the at least one plug-in is the same as a major version number of the first plug-in framework, each plug-in of the at least one plug-in has a second version number corresponding to the respective plug-in, the first plug-in framework has a first version number, the first version number and each second version number comprises a respective major version number, a respective sub version number, and a respective phase version number, and the first plug-in is a different plug-in from each plug-in of the at least one plug-in;
    receiving, by the electronic device, the first plug-in from a server in response to the first user operation;
    detecting, by the electronic device, whether a major version number of the first plug-in is the same as the major version number of the first plug-in framework; and
    when the main version number of the first plug-in is the same as the main version number of the first plug-in framework, installing, by the electronic device, the first plug-in.

2. The method according to claim 1, wherein a phase version number of the first plug-in is different from a phase version number of the first plug-in framework.

3. The method according to claim 1, wherein the at least one plug-in comprises a second plug-in, and the first plug-in is an update plug-in corresponding to the second plug-in.

4. The method according to claim 1, wherein the first plug-in is a new plug-in of the first application.

5. The method according to claim 1, wherein installing, by the electronic device, the first plug-in comprises:
    installing, by the electronic device, a class loader of the first plug-in by:
        creating, by the electronic device, an initial class loader of the first plug-in;
        determining, by the electronic device, whether an isolated Split attribute is configured for the first plug-in;
        when the isolated Split attribute is configured for the first plug-in, obtaining, by the electronic device, a storage path of a dynamic library file of the first plug-in; and
        adding, by the electronic device, the storage path of the dynamic library file to the initial class loader, and obtaining the class loader of the first plug-in.

6. The method according to claim 1, wherein the first plug-in is an artificial intelligence (AI) plug-in.

7. The method according to claim 6, wherein the AI plug-in comprises one or more of the following:
    a facial recognition plug-in, an image super-resolution plug-in, an intent recognition plug-in, a text translation plug-in, a speech recognition plug-in, a head unit voice wakeup plug-in, and a head unit speech recognition plug-in.

8. A method, comprising:
    when an electronic device detects an instruction to upgrade a system, obtaining, by the electronic device, a first system installation package from a server, wherein the first system installation package comprises an installation package of at least one application, the at least one application comprises a first application, the first application comprises a first plug-in framework and at least one plug-in associated with the first plug-in framework, a major version number of each plug-in of the at least one plug-in is the same as a major version number of the first plug-in framework, each plug-in of the at least one plug-in has a second version number corresponding to the plug-in, the first plug-in framework has a first version number, both the first version number and each second version number comprises a respective major version number, a respective sub version number, and a respective phase version number, an installation package of the first application comprises a third plug-in, the at least one plug-in that is comprised in the installed first application and stored in the electronic device comprises a fourth plug-in and a fifth plug-in, the third plug-in, the fourth plug-in, and the fifth plug-in have different version numbers but a same identifier, the fourth plug-in is stored in a preset partition of the electronic device, the fifth plug-in is stored in an installation partition of the electronic device, each plug-in carries a respective identifier, and plug-ins corresponding to a same function icon have a same identifier;
    detecting, by the electronic device, whether a version number of the third plug-in is later than version numbers of all plug-ins that are comprised in the installed first application and stored in the electronic device and whose identifiers are the same as an identifier of the third plug-in;
    when the version number of the third plug-in is later than version numbers of all plug-ins that are comprised in the installed first application and stored in the electronic device and whose identifiers are the same as an identifier of the third plug-in, detecting, by the electronic device, whether a major version number of the third plug-in is the same as the major version number of the first plug-in framework; and
    when the major version number of the third plug-in is the same as the major version number of the first plug-in framework, installing, by the electronic device, the third plug-in.

9. The method according to claim 8, wherein the installation package of the first application further comprises a second plug-in framework, the first plug-in framework and the second plug-in framework have different version numbers, and the method further comprises:

detecting, by the electronic device, whether a version number of the second plug-in framework is later than a version number of the first plug-in framework; and when the version number of the second plug-in framework is later than the version number of the first plug-in framework, installing, by the electronic device, the second plug-in framework.

10. An apparatus, comprising:

one or more processors and one or more memories, wherein the one or more memories are coupled to the one or more processors, the one or more memories are configured to store computer program code, and the computer program code comprises computer instructions, and when the one or more processors execute the computer instructions, the apparatus is caused to perform the following operations:

receiving a first user operation, wherein the first user operation requests to install a first plug-in related to a first application, the first application is an application locally installed in the apparatus, the first application comprises a first plug-in framework and at least one plug-in associated with the first plug-in framework, a major version number of each plug-in of the at least one plug-in is the same as a major version number of the first plug-in framework, each plug-in of the at least one plug-in has a second version number corresponding to the respective plug-in, the first plug-in framework has a first version number, the first version number and each second version number comprise a respective major version number, a respective sub version number, and a respective phase version number, and the first plug-in is a different plug-in from each plug-in of the at least one plug-in;

receiving the first plug-in from a server in response to the first user operation;

detecting whether a major version number of the first plug-in is the same as the major version number of the first plug-in framework; and when the major version number of the first plug-in is the same as the major version number of the first plug-in framework, installing the first plug-in.

11. The apparatus according to claim 10, wherein a phase version number of the first plug-in is different from a phase version number of the first plug-in framework.

12. The apparatus according to claim 10, wherein the at least one plug-in comprises a second plug-in, and the first plug-in is an update plug-in corresponding to the second plug-in.

13. The apparatus according to claim 10, wherein the first plug-in is a new plug-in of the first application.

14. The apparatus according to claim 10, wherein when the one or more processors execute the computer instructions, the apparatus is further caused to perform the following operations:

creating an initial class loader of the first plug-in;

determining whether an isolated Split attribute is configured for the first plug-in;

when the isolated Split attribute is configured for the first plug-in, obtaining a storage path of a dynamic library file of the first plug-in; and adding the storage path of the dynamic library file to the initial class loader, and obtaining a class loader of the first plug-in.

15. The apparatus according to claim 10, wherein the first plug-in is an artificial intelligence (AI) plug-in.

16. The apparatus according to claim 15, wherein the AI plug-in comprises one or more of the following:

a facial recognition plug-in, an image super-resolution plug-in, an intent recognition plug-in, a text translation plug-in, a speech recognition plug-in, a head unit voice wakeup plug-in, and a head unit speech recognition plug-in.

17. The apparatus according to claim 10, wherein the apparatus is a terminal device.

18. The apparatus according to claim 10, wherein the apparatus is a part of a terminal device.

19. The apparatus according to claim 10, wherein the first user operation is touch-and-hold operation or a slide-down operation.

20. The apparatus according to claim 10, wherein in each second version number, the major version number of the respective version number is separated from another part of the respective version number by a period.

* * * * *